(12) United States Patent
Weil et al.

(10) Patent No.: US 11,082,377 B2
(45) Date of Patent: Aug. 3, 2021

(54) SCRIPTED DIGITAL MEDIA MESSAGE GENERATION

(71) Applicant: NightLight Systems LLC, Wilmington, DE (US)

(72) Inventors: Joseph Weil, Novato, CA (US); Andrew Jarecki, New York, NY (US); Robert Gukiesen, New York, NY (US)

(73) Assignee: NightLight Systems LLC, Wilmington, DE (US)

( * ) Notice: Subject to any disclaimer, the term of this patent is extended or adjusted under 35 U.S.C. 154(b) by 0 days.

(21) Appl. No.: 16/911,206

(22) Filed: Jun. 24, 2020

(65) Prior Publication Data

US 2020/0328997 A1  Oct. 15, 2020

Related U.S. Application Data

(63) Continuation of application No. 15/915,384, filed on Mar. 8, 2018, now Pat. No. 10,735,361, which is a
(Continued)

(51) Int. Cl.
*G06F 3/048* (2013.01)
*H04L 12/58* (2006.01)
(Continued)

(52) U.S. Cl.
CPC .............. *H04L 51/10* (2013.01); *H04L 51/02* (2013.01); *H04M 1/7243* (2021.01); *H04W 4/12* (2013.01)

(58) Field of Classification Search
CPC ...... G06F 16/70; G06F 16/78; G06F 16/7834; G06F 16/7844; G06F 40/169; G06F 3/0482; G10L 15/26; H04L 51/02; H04L 51/10
See application file for complete search history.

(56) References Cited

U.S. PATENT DOCUMENTS 6,262,724 B1   7/2001  Crow et al.
6,624,826 B1   9/2003  Balabanovic
(Continued)

FOREIGN PATENT DOCUMENTS

CN      1868201 A    11/2006
CN    101114260 A     1/2008
(Continued)

OTHER PUBLICATIONS

"Video Editor 8.1 brings video editing with awesome video effects to windows phone", retrieved on Apr. 8, 2016 at <<http://mspoweruser.com/video-editor-8-1-brings-video-editing-with-awesome-video-effects-to-windows-phone/>>, 2016, 2 pages.
(Continued)

*Primary Examiner* — Claudia Dragoescu
(74) *Attorney, Agent, or Firm* — Invoke

(57) ABSTRACT

A method of generating a digital media message includes receiving a script of the digital media message, receiving a digital video segment based on the script, determining text of the digital media message corresponding to at least a portion of the video segment, and providing the text via a display of an electronic device. The method also includes providing a plurality of images, each indicative of a respective digital content segment, and receiving a first input indicating selection of a first digital content segment. The method further includes associating first digital content segment with either a first portion or a second portion of the video segment, and associating the various portions and the first digital content segment with a play sequence of the digital media message such that the first digital content segment will be presented simultaneously with at least part of the first portion when the digital media message is played.

20 Claims, 15 Drawing Sheets

Related U.S. Application Data continuation-in-part of application No. 14/683,779, filed on Apr. 10, 2015, now Pat. No. 10,037,185, which is a continuation of application No. 14/683,989, filed on Apr. 10, 2015, now abandoned, which is a continuation-in-part of application No. 14/569,169, filed on Dec. 12, 2014, now Pat. No. 9,973,459.

(60) Provisional application No. 62/042,114, filed on Aug. 26, 2014, provisional application No. 62/038,493, filed on Aug. 18, 2014.

(51) Int. Cl.
*H04W 4/12* (2009.01)
*H04M 1/7243* (2021.01)

(56) References Cited

U.S. PATENT DOCUMENTS

| | | |
|---|---|---|
| 7,209,167 B2 | 4/2007 | Pyle et al. |
| 7,353,282 B2 | 4/2008 | Nichols et al. |
| D597,101 S | 7/2009 | Chaudhri et al. |
| 7,562,302 B1 | 7/2009 | Barrus et al. |
| D621,849 S | 8/2010 | Anzures et al. |
| D626,138 S | 10/2010 | McLaughlin et al. |
| 7,873,911 B2 | 1/2011 | Gopalakrishnan |
| 8,290,777 B1 | 10/2012 | Nguyen et al. |
| 8,428,453 B1 | 4/2013 | Spiegel et al. |
| D701,526 S | 3/2014 | Poston et al. |
| D701,533 S | 3/2014 | Jin et al. |
| D704,205 S | 5/2014 | Greisson et al. |
| 8,737,815 B2 | 5/2014 | Singer |
| D727,931 S | 4/2015 | Kim et al. |
| D728,590 S | 5/2015 | Kim et al. |
| 9,323,733 B1 | 4/2016 | McGhee et al. |
| 2003/0063130 A1 | 4/2003 | Barbieri et al. |
| 2003/0167264 A1 | 9/2003 | Ogura et al. |
| 2003/0221541 A1 | 12/2003 | Platt |
| 2004/0070608 A1 | 4/2004 | Saka |
| 2004/0075663 A1 | 4/2004 | Plante |
| 2006/0139340 A1 | 6/2006 | Geaghan |
| 2008/0229204 A1 | 9/2008 | Johnson et al. |
| 2009/0013001 A1 | 1/2009 | Park et al. |
| 2009/0100068 A1 | 4/2009 | Gauba et al. |
| 2009/0106200 A1 | 4/2009 | Salinas et al. |
| 2009/0263044 A1 | 10/2009 | Imagawa et al. |
| 2009/0304359 A1 | 12/2009 | Lemay et al. |
| 2009/0327856 A1 | 12/2009 | Mouilleseaux et al. |
| 2010/0064239 A1 | 3/2010 | Crawford et al. |
| 2010/0077289 A1 | 3/2010 | Das et al. |
| 2010/0095240 A1 | 4/2010 | Shiplacoff et al. |
| 2010/0125791 A1* | 5/2010 | Katis ................. H04M 3/42221 715/716 |
| 2010/0223314 A1* | 9/2010 | Gadel ..................... H04L 51/38 709/200 |
| 2011/0086616 A1 | 4/2011 | Brand et al. |
| 2011/0163969 A1 | 7/2011 | Anzures et al. |
| 2011/0163971 A1 | 7/2011 | Wagner et al. |
| 2011/0229111 A1 | 9/2011 | Bonarrigo et al. |
| 2011/0258547 A1 | 10/2011 | Symons et al. |
| 2011/0264755 A1 | 10/2011 | De Villiers |
| 2012/0005595 A1 | 1/2012 | Gavade et al. |
| 2012/0066594 A1 | 3/2012 | Gavade et al. |
| 2012/0151346 A1 | 6/2012 | McClements, IV |
| 2012/0284094 A1 | 11/2012 | De et al. |
| 2012/0308209 A1 | 12/2012 | Zaletel |
| 2013/0034341 A1 | 2/2013 | Ichikawa et al. |
| 2013/0055087 A1 | 2/2013 | Flint |
| 2013/0132904 A1 | 5/2013 | Primiani et al. |
| 2013/0173727 A1 | 7/2013 | Libin et al. |
| 2013/0212521 A1 | 8/2013 | Fedoseyeva et al. |
| 2013/0282514 A1 | 10/2013 | Dougherty et al. |
| 2013/0294746 A1 | 11/2013 | Oz et al. |
| 2014/0007257 A1 | 1/2014 | Dougherty et al. |
| 2014/0055633 A1 | 2/2014 | Marlin et al. |
| 2014/0100893 A1 | 4/2014 | Zizzi |
| 2014/0108928 A1 | 4/2014 | Mumick |
| 2014/0147095 A1 | 5/2014 | Oz et al. |
| 2014/0163957 A1 | 6/2014 | Tesch et al. |
| 2014/0163980 A1 | 6/2014 | Tesch et al. |
| 2014/0310748 A1 | 10/2014 | Dureau et al. |
| 2015/0092006 A1 | 4/2015 | Grossman et al. |
| 2015/0095804 A1* | 4/2015 | Grossman ........... G06F 3/04883 715/753 |
| 2015/0382056 A1 | 12/2015 | Burton et al. |
| 2016/0048306 A1 | 2/2016 | Weil et al. |
| 2016/0048313 A1 | 2/2016 | Weil et al. |
| 2016/0048373 A1 | 2/2016 | Weil et al. |
| 2016/0050172 A1 | 2/2016 | Weil et al. |
| 2016/0203112 A1 | 7/2016 | Asamani et al. |
| 2016/0205431 A1 | 7/2016 | Avedissian et al. |
| 2016/0226806 A1 | 8/2016 | Weil et al. |

FOREIGN PATENT DOCUMENTS

| | | |
|---|---|---|
| CN | 101262418 A | 9/2008 |
| CN | 101652972 A | 2/2010 |
| CN | 102651731 A | 8/2012 |
| CN | 103154876 A | 6/2013 |
| CN | 103164152 A | 6/2013 |
| CN | 103842936 A | 6/2014 |
| CN | 107003720 A | 8/2017 |
| EP | 3183644 A1 | 6/2017 |
| WO | 2011/098925 A1 | 8/2011 |
| WO | 2014/100893 A1 | 7/2014 |
| WO | 2016/028394 A1 | 2/2016 |
| WO | 2016/028395 A1 | 2/2016 |
| WO | 2016/028396 A1 | 2/2016 |
| WO | 2016/028397 A1 | 2/2016 |

OTHER PUBLICATIONS

Decneut et al., "Targeting heterogeneous multimedia environments with Web services", Proceedings of IEEE International Conference on Web Services, 2004, pp. 682-689.

How to Sent Voice Messages in WhatsApp, Aug 12, 2013, https://www.youtube.com/watch?v=mkJqYO984v0.

Nguyen, N., "Stop, Collaborate, and Remix: Meet MixBit, an Mobile Video Editor", retrieved on Apr. 8, 2016 at <<http://www.popsugar.com/tech/MixBit-Video-App-31107598>>, 2016, 5 pages.

Pizano et al., "Integrated multimedia messaging concepts and applications", Proceedings of the 1996 ACM symposium on Applied Computing SAC '96, 1996, pp. 12-16.

Proof Snapchat Doesn't Delete Your Photos/Videos After They Expire, May 17, 2013, https://www.youtube.com/watch?v=xPHsM9gXOnY.

Snapchat—Now with Video, Dec. 13, 2012, https://www.youtube.com/watch?v=r4237MZlb8g.

Wochit, "How it Works: Details on our Video Creation Platform," retrieved Nov. 25, 2015 at <<https://www.wochit.com/how-it-works/>>, Wochit Inc., 2015.

\* cited by examiner

SCRIPTED DIGITAL MEDIA MESSAGE GENERATION

INCORPORATION BY REFERENCE; DISCLAIMER

Each of the following applications are hereby incorporated by reference: application Ser. No. 15/915,384 filed on Mar. 8, 2018; application Ser. No. 14/683,779 filed Apr. 10, 2015; application Ser. No. 14/683,989 filed Apr. 10, 2015; application Ser. No. 14/569,169 filed Dec. 12, 2014; application Ser. No. 62/042,114 filed Aug. 26, 2014; application No. 62/038,493 filed Aug. 18, 2014, The entire disclosures of each of the above applications are incorporated herein by reference. The Applicant hereby rescinds any disclaimer of claim scope in the parent application(s) or the prosecution history thereof and advises the USPTO that the claims in this application may be broader than any claim in the parent application(s).

BACKGROUND

It is common for users of electronic devices to communicate with other remote users by voice, email, text messaging, instant messaging, and the like. While these means of electronic communication may be convenient in various situations, such means are only suited for transferring isolated segments or files of content between users. For instance, while text messages and email may be used to transmit written dialogue between users, and audio, video, web content, or other files may be transmitted with the text or email messages as attachments, such files are not integrated with the various components of the text or email message in any way.

As a result, electronic device messaging applications have been developed to assist the user in creating digital messages that include, for example, images, audio, or other content. However, the functionality of existing messaging applications is limited. For example, such applications do not enable the user to combine a wide array of digital content segments (e.g., a digital video segment and a digital image) such that portions of two or more content segments, including content segments from different sources, can be presented to the recipient simultaneously as an integrated component of the digital message. Additionally, such applications do not provide the user with the ability to easily edit the digital message during creation. Further, while a variety of different audio and/or video editing software is available, such software does not provide any guidance to the user when preparing a digital content message. In particular such software does not provide desired text of an unformed digital media message (e.g., a script) to the user as a digital video segment is being captured, nor does such software enable the user to easily replace a portion of the digital video segment, such as at least a portion of a video track of the digital video segment, with an image or other digital content segment of the user's choosing. As a result, such video editing software is not suitable for use in creating digital messages as a means of communication between electronic device users.

Example embodiments of the present disclosure are directed toward curing one or more of the deficiencies described above.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
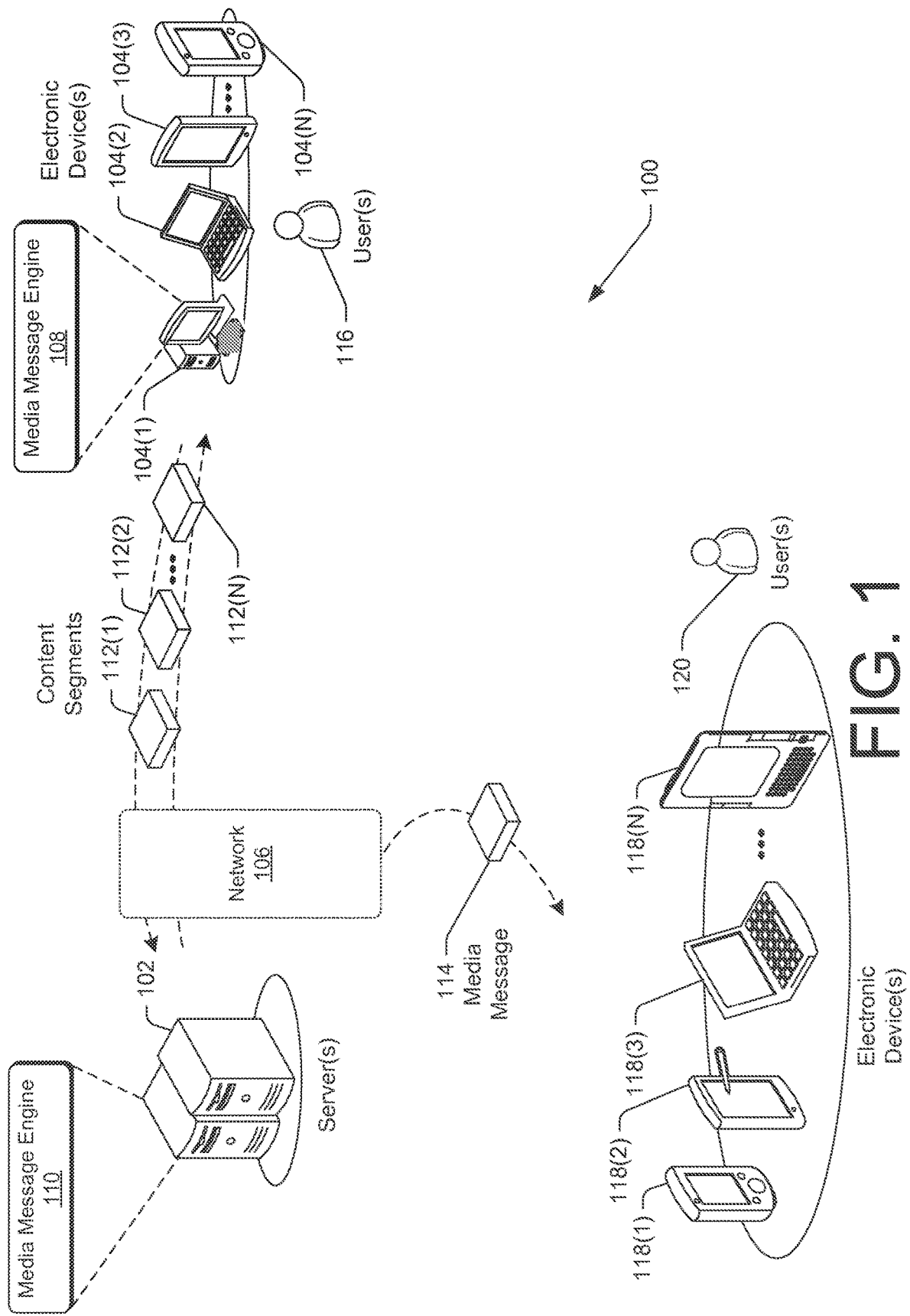
FIG. 1 is a schematic of an illustrative computing environment for implementing various embodiments of digital media message generation.

The disclosure is directed to devices and techniques for generating digital media messages that can be easily shared between users of electronic devices as a means of communication. The techniques described herein enable users to combine a variety of different digital content segments into a single digital media message. For example, the user may create a digital media message by capturing audio content segments, video content segments, digital images, web content, and the like. Such digital content segments may be captured by the user during generation of the digital media message. Alternatively, such content segments may be captured by the user prior to generating the digital media message, and may be saved in a memory of the electronic device or in a memory separate from the device (e.g., on a server accessible via a network, etc.) for incorporation into the digital media message at a later time. As part of generating the digital media message, the user may select one or more of the digital content segments for incorporation into the message and may associate the selected content segments with respective positions in a play sequence of the digital media message.

In some embodiments, the electronic device may assist the user in generating the digital media message in a number of ways. For example, the device may receive a desired script of the digital media message from the user or from another source. For example, the user may dictate, type, and/or otherwise provide text of the script to the electronic device. In examples in which the user types the text of the script using the device, the device may directly receive the text the script from the user. Alternatively, in examples in which the user dictates the script, the electronic device may receive voice and/or other audio input from the user (e.g., the dictation), and may generate the text of the script, based on such input, using a voice recognition module of the device. The electronic device may provide the text of the script to the user via a display of the device while capturing, recording, and/or otherwise receiving a corresponding digital video segment. In such examples, the received digital video segment may comprise video of the user reading the text of the script, or an approximation thereof. Thus, in some examples, the content of the received digital video segment or other such digital content segment may be based on the script.

Additionally, the digital video segment may include a plurality of consecutive portions, and such portions may be indicative of desired divisions in the digital media message. For example, such portions may be indicative of one or more potential locations in which the user may wish to add or insert additional digital content segments into a play sequence of the digital media message. In some examples, the text of the script may be divided into a plurality of separate parts (e.g., sentences, sentence fragments, groups of sentences, etc.), and at least one of the individual parts may correspond to a respective portion of the digital video segment. The electronic device may form one or more portions of the digital video segment in response to input received from the user. For example, the user may provide a touch input or a plurality of consecutive touch inputs while the digital video segment is being recorded. In such examples, the electronic device may form the plurality of consecutive portions in response to the plurality of consecutive touch inputs. For instance, two consecutive touch inputs may result in the formation of a corresponding portion of the plurality of consecutive portions. In such examples, the first touch input may identify the beginning of a portion of the digital video segment, and the second touch input may identify the end of the portion.

An example digital media message generation method may also include determining text of the digital media message corresponding to each respective portion of the digital video segment described above, and providing the text to the user via the display. In some examples, the electronic device may determine the text of the message correlating, recognizing, and/or otherwise matching at least part of an audio track of the digital video segment with the text of the script. In such examples, the audio track may be matched with the text of the script based on the elapsed time, sequence, breaks in the audio track, or other characteristics of the audio track, and the matching text of the script may be used and/or provided to the user as text of the digital media message. For example, the electronic device may match individual parts of the script with corresponding respective portions of the digital video segment, and may provide the matching text of the script to the user as text of the digital media message. Alternatively, in other examples at least part of the audio track of the digital video segment may be used as an input to a voice recognition module of the electronic device. In such examples, the voice recognition module may generate the text of the digital media message as an output, based on the audio track.

In each of the embodiments described herein, the text of the digital media message corresponding to the respective consecutive portions of the digital video segment may be provided to the user via the display. In some examples, the text may be displayed with lines, boxes, numbering, markings, coloring, shading, or other visual indicia separating various portions of the text. For example, the text of the digital media message corresponding to a first portion of the plurality of consecutive portions of the digital video segment may be displayed as being separate from text corresponding to a second portion of the plurality of portions. In some examples, the text corresponding to the first portion may be displayed at a first location on the display and the text corresponding to the second portion may be displayed at a second location on the display different from the first portion.

Additionally, the user may select one or more digital content segments to be presented simultaneously with audio or other portions of the digital video segment when the digital media message is played by a recipient of the digital media message on a remote device. In such examples, the digital video segment may comprise the main, primary, and/or underlying content on which the digital media message is based, and the various selected digital content segments may comprise additional or supplemental content that may be incorporated into the underlying digital video segment as desired. In such examples, the underlying digital video segment may have an elapsed time, length or duration that defines the elapsed time of the resulting digital media message.

The electronic device may provide a plurality of images via the display to assist the user in selecting one or more digital content segments for inclusion into the digital media message. Each image may be indicative of a respective digital content segment different from the digital video segment. For example, the user may provide an input indicating selection of a portion of the digital video segment with which an additional digital content segment should be associated. The plurality of images described above may be displayed at least partly in response to such an input. Once such images are displayed, the user may provide an input indicating selection of one or more digital content segments associated with corresponding respective images. For example, the user may provide a touch input at a location on the display in which a particular image is provided. Such a touch input may indicate selection of a digital content segment associated with the particular image. The electronic device may then associate the selected digital content segment with the selected portion of the digital video segment.

In some examples, the digital video segment may include and/or may be segmented into separate tracks or sections, such as an audio track and a video track. In example embodiments, at least part of one or more such tracks of the digital video segment may be supplemented, augmented, overwritten, and/or replaced by selected digital content segments during formation of the digital media message. For example, a digital image of a selected digital content segment lay replace at least part of the video track of the underlying digital video segment when the selected digital content segment is associated with the digital video segment. As a result, the digital image of the selected digital content segment may be presented simultaneously with a portion of the audio track of the digital video segment corresponding to the replaced portion of the video track. The user may also edit or revise the digital video segment, the digital content segments, or various other portions of the digital media message while the digital media message is being generated.

Replacing, for example, part of the video track of the underlying digital video segment with the digital image may reduce the file size of the digital video segment and/or of a combined segment formed by combining the digital image with the digital video segment. In particular, the replaced portion of the video track typically would typically be rendered at approximately 300 frames/second for a duration of the portion of the video track, and would be characterized by a commensurate memory and/or file size (e.g., in bytes). The selected digital image, on the other hand, comprises a single frame that will be rendered for the duration of the replaced portion of the video track. Thus, replacing a portion of the video track of the underlying digital video segment with the digital reduces the number of frames/second of the underlying video segment, thereby reducing file size thereof. As a result, a digital media message generated using such techniques will have a smaller file size and will require/take up less memory than a corresponding digital media message generated underlying digital video segment with the video track unchanged (e.g., without replacing a portion of the video track with a selected digital image).

Reducing the file size and/or memory requirements of digital media messages in this way has many technical effects and/or advantages. For example, such a reduction in file size and/or memory requirements will enable the various networks, servers, and/or electronic devices described herein to transfer such digital media messages more quickly and with fewer network, server, and/or device resources. As a result, such a reduction in file size and/or memory requirements will reduce overall network load/traffic, and will improve network, server, and/or electronic device performance. As another example, such a reduction in file size and/or memory requirements will enable the various networks, servers, and/or electronic devices described herein to provide, render, display, and/or otherwise process such digital media messages more quickly and with fewer network, server, and/or device resources. In particular, such a reduced file size may reduce the server and/or electronic device memory required to receive and/or store such messages. Such a reduced file size may also reduce the processor load required to provide, render, display, and/or otherwise process such digital media messages. As a result, such a reduction in file size and/or memory requirements will reduce overall network load/traffic, and will improve network, server, and/or electronic device performance and efficiency.

In various embodiments, the devices and techniques described herein may enable users of electronic devices to communicate by transmitting digital media messages that include a rich, unique, and artful combination of digital video segments and/or other digital content segments. Such content segments may be combined in response to, for example, a series of simple touch gestures received from a user of the electronic device. Methods of generating such digital media messages may be far simpler and less time consuming than using, for example, known audio and/or video editing software. Additionally, methods of generating such digital media messages may enable users to combine and present multiple content segments in ways that are not possible using existing messaging applications. Example methods of the present disclosure may also assist the user in generating digital media messages by providing desired text (e.g., a script) of the digital media message to the user as a guide while the underlying digital video segment of the message is being captured. Such text may be generated (e.g., created) and entered (e.g., typed, dictated, and/or otherwise provided) by the user as part of the digital media message generation process. Such methods may also provide text of the digital media message to the user to assist the user in adding digital content segments to the digital media message at locations that correspond contextually to various portions of the message.

Illustrative environments, devices, and techniques for generating digital media messages are described below. However, the described message generation techniques may be implemented in other environments and by other devices or techniques, and this disclosure should not interpreted as being limited to the example environments, devices, and techniques described herein.

Illustrative Architecture

FIG. 1 is a schematic diagram of an illustrative computing environment 100 for implementing various embodiments of scripted digital media message generation. The computing environment 100 may include server(s) 102 and one or more electronic devices 104(1)-104(N) (collectively "electronic devices 104") that are communicatively connected by a network 106. The network 106 may be a local area network ("LAN"), a larger network such as a wide, area network ("WAN"), or a collection of networks, such as the Internet. Protocols for network communication, such as TCP/IP, may be used to implement the network 106. Although embodiments are described herein as using a network such as the Internet, other distribution techniques may be implemented that transmit information via memory cards, flash memory, or other portable memory devices.

A media message engine 108 on the electronic devices 104 and/or a media message engine 110 on the server(s) 102 may receive one or more digital video segments, digital audio segments, digital images, web content, text files, audio files, spreadsheets, and/or other digital content segments 112(1)-112(N) (collectively, "digital content segments 112" or "content segments 112") and may generate one or more digital media messages 114 (or "media messages 114") using one or more parts, components, audio tracks, video tracks, and/or other portions of at least one of the content segments 112. In example embodiments, the media message engine 108 may receive one or more content segments 112 via interaction of a user 116 with an electronic device 104. In some embodiments, the media message engine 108 may provide such content segments 112 to the media message engine 110 on the server 102, via the network 106, to generate at least a portion of the media message 114. Alternatively, at least a portion of the media message 114 may be generated by the media message engine 108 of the respective electronic device 108. In either example, the media message 114 may be directed to one or more additional electronic devices 118(1)-118(N) (collectively "electronic devices 118") via the network 106. Such electronic devices 118 may be disposed at a location remote from the electronic devices 104, and one or more users 120 may consume the digital media message 114 via one or more of the electronic devices 118.

Each of the electronic devices 104 may include a display component, a digital camera configured to capture still photos, images, and/or digital video, and an audio input and transmission component. Such audio input and transmission components may include one or more microphones. In some examples, the digital camera may include a video sensors, light sensors, and/or other video input components configured to capture and/or form a video track of a digital content segment 112, and the electronic device 104 may also include one or more audio sensors, microphones, and/or other audio input and transmission components configured to capture and/or form a corresponding audio track of the same digital content segment 112. The electronic devices 104 may also include hardware and/or software that support voice over Internet Protocol (VoIP) as well as any of the display, input, and/or output components described herein. Each of the electronic devices 104 may further include a web browser that enables the user 116 to navigate to a web page via the network 106. In some embodiments, the user 116 may generate and/or capture one or more digital content segments 112 using, for example, the camera and the microphone. For example, the user 116 may capture one or more digital images using the camera and/or may capture one or more digital video segments using the camera in conjunction with the microphone. Additionally, each web page may present content that the user 116 may capture via the electronic device 104, using various copy and/or save commands included in the web browser of the electronic device 104, and the user may incorporate such content into one or more content segments 112. Any of the content segments 112 described herein may be provided to one or both of the media message engines 108, 110, and the media message engines 108, 110 may incorporate such content segments 112, and/or portions thereof, into the media message 114.

Upon receiving the content segments 112 described herein, the media message engines 108, 110 may tag the respective content segments 112 with associated metadata. The associated metadata may include profile information about the type of content (e.g., image, video, audio, text, animation, etc.), the source of the content segment 112 (e.g., camera, microphone, internet web page, etc.), and/or a position or location in a play sequence of the digital media message 114 with which the content segment 112 is to be associated.

The media message engines 108, 110 described herein may integrate and/or otherwise combine two or more content segments 112 to form the digital media message 114. In some examples, the content segments 112 may be presented to the user sequentially when the media message 114 is played. Alternatively, the media message engines 108, 110 may combine at least part of two or more content segments 112 such that, for example, at least part of a first content segment 112 is presented simultaneously with at least part of a second content segment 112 when the media message 114 is played. For example, a second digital content segment 112(2) comprising a digital photo or image may be combined with audio from at least part of a first digital content segment 112(1) comprising a digital video segment. As a result, the audio from the first digital content segment 112(1) may be presented simultaneously with the image from the second digital content segment 112(2) when the resulting digital media message 114 is played. In such examples, the first digital content segment 112(1) (e.g., the digital video segment) may comprise an underlying digital content segment forming the basis and/or background of the digital media message 114. In such examples, one or more additional digital content segments (e.g., digital images, audio, etc.) may be combined with the first digital content segment 112(1) when the digital media message 114 is formed.

During this process, the additional digital content segments may replace corresponding portions of the first digital content segment 112(1). For example, a digital image of the second digital content segment 112(2) may replace a corresponding video portion and/or image of the first digital content segment 112(1) when the second digital content segment 112(2) is combined with the particular portion of the first digital content segment 112(1). As a result, audio of the particular portion of the first digital content segment 112(1) may be presented simultaneously with the digital image of the second digital content segment 112(2) when the resulting digital media message 114 is played. The media message engines 108, 110 may also distribute the finalized media message 114 to one or more of the electronic devices 118. Various example components and functionality of the media message engines 108, 110 will be described in greater detail below with respect to, for example, FIGS. 2 and 3.

In any of the example embodiments described herein, replacing, for example, a portion of a first digital content segment 112(1) (e.g., at least a portion of a video track of a digital video segment) with a second digital content segment 112(2) (e.g., a digital image) may reduce the file size and/or memory requirements of the first digital content segment 112(1) and/or of a combined segment formed by combining the second digital content segment 112(2) with the first digital content segment 112(1). In some examples, a replaced portion of a video track of the first digital content segment 112(1) may be rendered at approximately 300 frames/second for a duration of the portion of the video track, and would be characterized by a commensurate memory and/or file size (e.g., in bytes). The digital image of the second digital content segment 112(2), on the other hand, may comprise a single frame that will be rendered for the duration of the replaced portion of the video track. Thus, replacing a portion of the video track of the first digital content segment 112(1) with the digital image of the second digital content segment 112(2) may reduce the number of frames/second of the combined segment, thereby reducing the file size thereof relative to the unaltered first digital content segment 112(1). As a result, a digital media message 114 generated using such techniques will have a smaller file size and will require/take up less memory than a corresponding digital media message generated using the first digital content segment 112(1) with the video track unchanged (e.g., without replacing a portion of the video track with a selected digital image).

Reducing the file size and/or memory requirements of digital media messages 114 in this way has many technical effects and/or advantages. For example, such a reduction in file size and/or memory requirements will enable the various networks 106, servers 102, and/or electronic devices 104, 118 described herein to transfer such digital media messages 114 more quickly and with fewer network, server, and/or device resources. As a result, such a reduction in file size and/or memory requirements will reduce overall network load/traffic, and will improve network, server, and/or electronic device performance. As another example, such a reduction in file size and/or memory requirements will enable the various networks 106, servers 102, and/or electronic devices 104, 118 described herein to provide, render, display, and/or otherwise process such digital media messages 114 more quickly and with fewer network, server, and/or device resources. In particular, such a reduced file size may reduce the server and/or electronic device memory required to receive and/or store such messages 114. Such a reduced file size may also reduce the server and/or electronic device processor load required to provide, render, display, and/or otherwise process such digital media messages 114. As a result, such a reduction in file size and/or memory requirements will reduce overall network load/traffic, and will improve network, server, and/or electronic device performance and efficiency.

In various embodiments, the electronic devices 104, 118 may include a mobile phone a portable computer, a tablet computer, an electronic book reader device (an "eBook reader device"), or other devices. Each of the electronic devices 104, 118 may have software and hardware components that enable the display of digital content segments 112, either separately or combined, as well as the various digital media messages 114 described herein. The electronic devices 104, 118 noted above are merely examples, and other electronic devices that are equipped with network communication components, data processing components, electronic displays for displaying data, and audio output capabilities may also be employed.

Example Server

Figure 2:
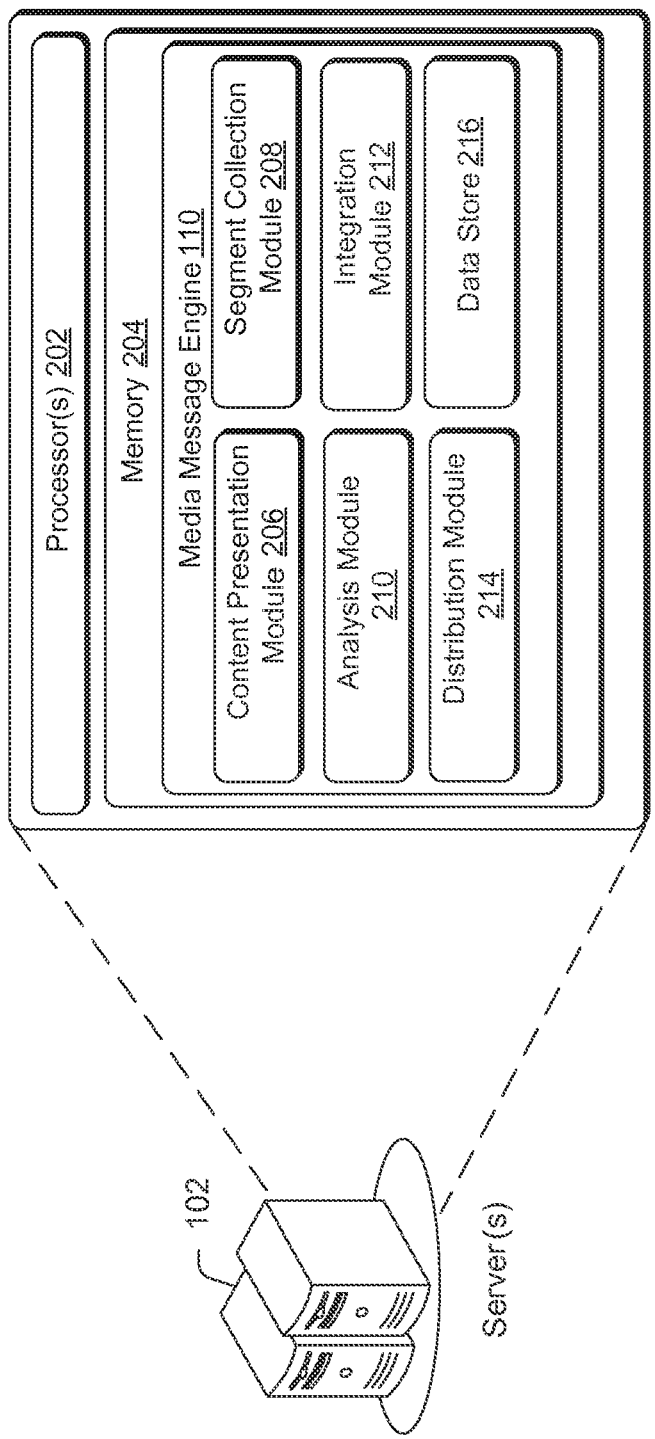
FIG. 2 is a schematic diagram of illustrative components in an example server that may be used in an example digital media message generation environment.

FIG. 2 is a schematic diagram of illustrative components in example server(s) 102 of the present disclosure. The server(s) 102 may include one or more processor(s) 202 and memory 204. The memory 204 may include computer readable media. Computer readable media may include volatile and non volatile, removable and non-removable media implemented in any method or technology for storage of information such as computer readable instructions, data structures, program modules, or other data. As defined herein, computer readable media does not include communication media in the form of modulated data signals, such as carrier waves, or other transmission mechanisms.

The media message engine 110 may be a hardware or a software component of the server(s) 102, and in some embodiments, the media message engine 110 may comprise a component of the memory 204. As shown in FIG. 2, in some embodiments the media message engine 110 may include one or more of a content presentation module 206, a segment collection module 208, an analysis module 210, an integration module 212, and a distribution module 214. The modules may include routines, programs instructions, objects, and/or data structures that perform particular tasks or implement particular abstract data types. The server(s) 102 may also implement a data store 216 that stores data, digital content segments 112, and/or other information or content used by the media message engine 110.

The content presentation module 206 may enable a human reader to select digital content segments 112 for the purpose of including the selected digital content segments 112 in a digital media message 114. In various embodiments, the content presentation module 206 may present a web page to a user 116 of an electronic device 104, such as via the network 106. In further embodiments, the content presentation module 206 may present digital content, information, and/or one or more digital content segments 112 to the user 116 of an electronic device 104 via the network 106. The content presentation module 206 may also enable the user 116 to select content, information, and/or one or more digital content segments 112. Once the user 116 has selected, for example, a digital content segment 112, the content presentation module 206 may present further content, information, and/or digital content segments 112 to the user 116. The content presentation module 206 may also tag the selected digital content segment 112 for inclusion in the digital media message 114.

The segment collection module 208 may collect audio recordings, video recordings, images, files, web content, audio files, video files, web addresses, and/or other digital content segments 112 identified, selected, and/or captured by the user 116. Additionally, the segment collection module 208 may label each digital content segment 112 with metadata. The metadata may include profile information about the type of content (e.g., image, video, audio, text, animation, etc.), the source of the content segment 112 (e.g., camera, microphone, internet web page, etc.), and/or a position or location in a play sequence of the digital media message 114 with which the content segment 112 is to be associated. For example, the metadata for an audio recording may include identification information identifying the digital content segment 112 as comprising an audio recording, information indicating that the digital content segment 112 was captured using a microphone of an electronic device 104, information indicating the date and time of recordation, the length of the recording, and/or other information. Such metadata may be provided to the content presentation module 206 by the segment collection module 208 or alternatively, such metadata may be provided to the segment collection module 208 by the content presentation module 206.

The analysis module 210 may be used by the segment collection module 208 to determine whether a collected content segment 112 meets certain quality criteria. In various embodiments, the quality criteria may include whether a background noise level in the content segment 112 is below a maximum noise level, whether video and/or image quality in the content segment 112 is above a minimum pixel or other like quality threshold, and so forth.

The integration module 212 may use at least a portion of the metadata described above to assess and/or otherwise determine which content segment 112 to select for integration into the digital media message 114. Additionally or alternatively, the integration module 212 may use results received from the analysis module 210 to make one or more such determinations. Such determinations may be provided to the user 116 of the electronic device 104 while a digital media message 114 is being generated as a way of guiding the user wish regard to the combination of one or more content segments 112. For instance, the integration module 212 may provide advice, suggestions, or recommendations to the user 116 as to which content segment 112 to select for integration into the digital media message 114 based on one or more of the factors described above.

The distribution module 214 may facilitate presentation of the digital media message 114 to one or more users 120 of the electronic devices 118. For example, once completed, the distribution module 214 may direct the digital media message 114 to one or more of the electronic devices 118 via the network 106. Additionally or alternatively, the distribution module 214 may be configured to direct one or more digital content segments 112 between the servers 102 and one or more of the electronic devices 104. In such embodiments, the distribution module 214 may comprise one or more kernels, drivers, or other like components configured to provide communication between the servers 102 and one or more of the electronic devices 104, 118.

The data store 216 may store any of the metadata, content, information, or other data utilized in creating one or more content segments 112 and/or digital media messages 114. For example, the data store 216 may store any of the images, video files, audio files, web links, media, or other content that is captured or otherwise received via the electronic device 104. Such content may be, for example, provided to the data store 216 via the network during creation of a content segment 112 and/or a digital media message 114. Alternatively, such content may be provided to the data store 216 prior to generating a content segment 112 and/or a digital media message 114. In such examples, such content may be obtained and/or received from the data store 216 during generation of a content segment 112 and/or a digital media message 114.

In example embodiments, one or more modules of the media message engine 110 described above may be combined or omitted. Additionally, one or more modules of the media message engine 110 may also be included in the media message engine 108 of the electronic device 104. As a result, the example methods and techniques of the present disclosure, such as methods of generating a digital media message 114, may be performed solely on either the server 102, or solely on one of the electronic devices 104. Alternatively, in further embodiments, methods and techniques of the present disclosure may be performed, at least in part, on both the server 102 and one of the electronic devices 104.

Example Electronic Device

Figure 3:
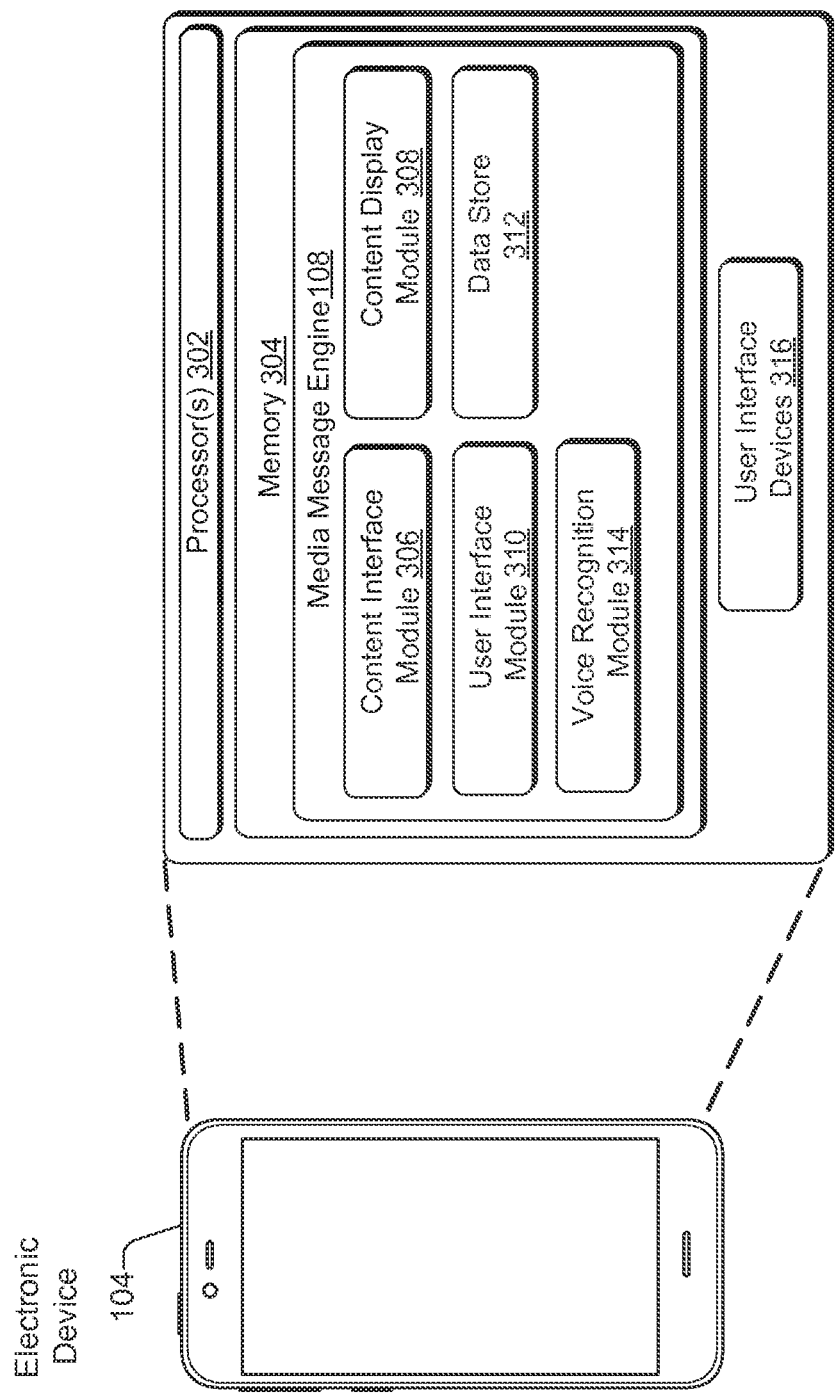
FIG. 3 is a schematic diagram of illustrative components in an example electronic device that may be used in an example digital media message generation environment.

FIG. 3 is a schematic diagram of illustrative components in an example electronic device 104 that is used to prepare and/or consume digital content segments 112 and digital media messages 114. As noted above, the electronic device 104 shown in FIG. 3 may include one or more of the components described above with respect to the server 102 such that digital content segments 112 and/or digital media messages 114 may be created and/or consumed solely on the electronic device 104. Additionally and/or alternatively, the electronic device 104 may include one or more processor(s) 302 and memory 304. The memory 304 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as a carrier wave, or other transmission mechanisms.

Similar to the memory 204 of the server 102, the memory 304 of the electronic device 104 may also include a media message engine 108, and the engine 108 may include any of the modules or other components described above with respect to the media message engine 110. Additionally or alternatively, the media message engine 108 of the electronic device 104 may include one or more of a content interface module 306, a content display module 308, a user interface module 310, a data store 312 similar to the data store 216 described above, and a voice recognition module 314. The modules described herein may include routines, programs, instructions, objects, and/or data structures that perform particular tasks or implement particular abstract data types. The electronic device 104 may also include one or more cameras, video cameras, microphones, displays (e.g., a touch screen display), keyboards, mice, touch pads, proximity sensors, capacitance sensors, or other user interface devices 316. Such user interface devices 316 may be operably connected to the processor 302 via, for example, the user interface module 310. As a result, input received via one or more of the user interface devices 316 may be processed by the user interface module 310 and/or may be provided to the processor 302 via the user interface module 310 for processing.

The content interface module 306 may enable the user to request and download content, digital content segments 112, or other information from the server(s) 102 and/or from the internet. The content interlace module 306 may download such content via any wireless or wired communication interfaces, such as Universal Serial Bus (USB), Ethernet, Bluetooth®, Wi-Fi, and/or the like. Additionally, the content interface module 306 may include and/or enable one or more search engines or other applications on the electronic device 104 to enable the user 116 to search for images, video, audio, and/or other content to be included in a digital media message 114.

The content display module 308 may present content, digital content segments 112, digital media messages 114, or other information on a display of the electronic device 104 for viewing. For example, the content display module 308 may present text of a script of the digital media message 114, text of the digital media message 114 itself, and/or other content to the user 116 via such a display. In various embodiments, the content display module 308 may provide functionalities that enable the user 116 to manipulate individual digital content segments 112 or other information as a digital media message 114 is being generated. For example, the content display module 308 may provide editing functionality enabling the user 116 to delete, move, modify, augment, cut, paste, copy, save, or otherwise alter portions of each digital content segment 112 as part of generating a digital media message 114.

The voice recognition module 314 may comprise hardware (e.g., one or more processors and/or memory), software (e.g., one or more operating systems, kernels, neural networks, etc.), or a combination thereof configured to receive audio input, such as an audio track of a received digital content segment 112, an audio file, a video file, and/or other input. In response to receiving such input, the voice recognition module 314 may process the input and determine text included in such input. For example, the voice recognition module 314 may receive an audio track of a digital video segment comprising video of the user 116 speaking. The voice recognition module 314 may process such input using one or more voice recognition algorithms, neural networks, look-up tables, and/or other components to determine text included in the input, and may provide such text to the content display module 308 and/or other components of the electronic device 104 as an output.

Example User Interfaces

Figure 4:
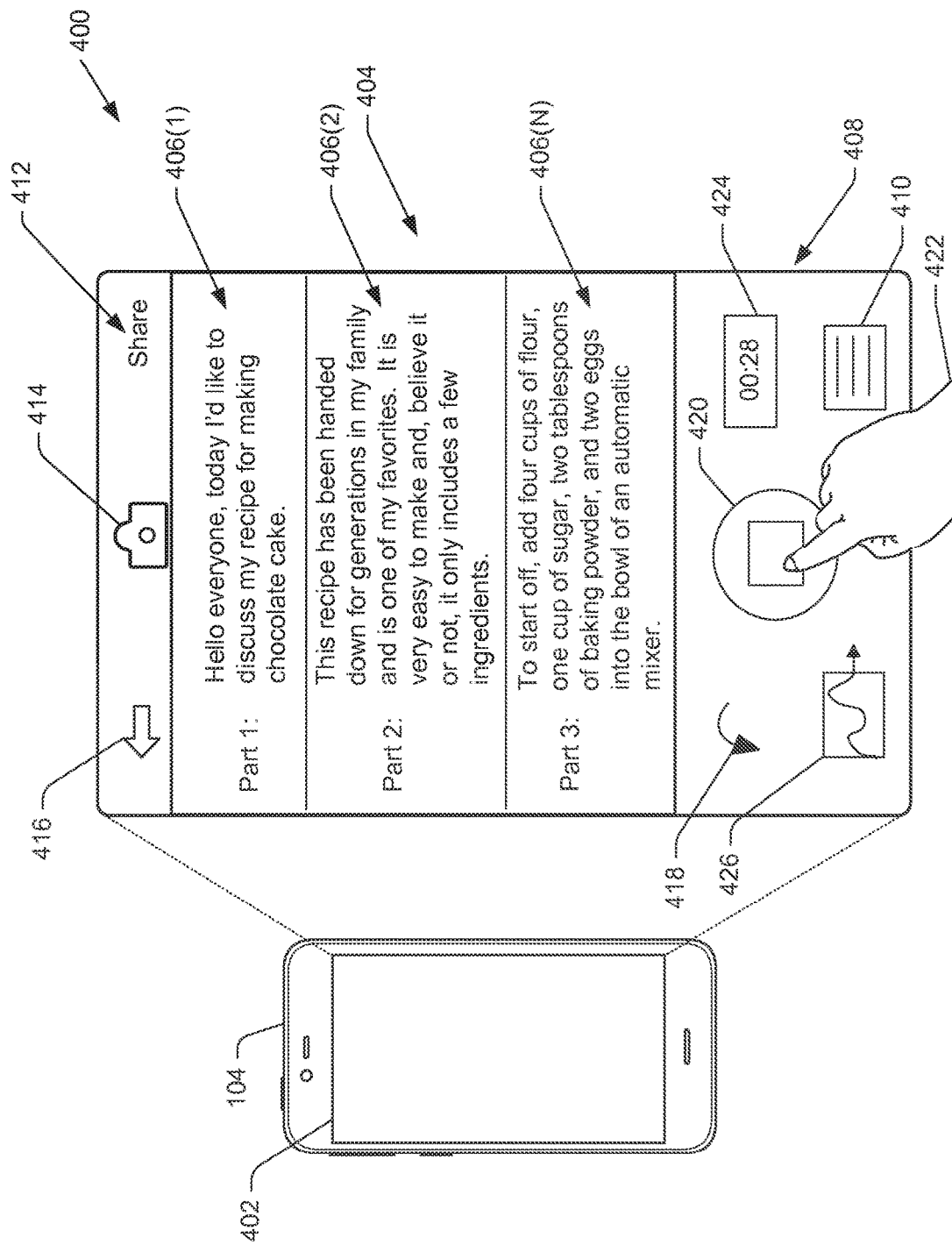
FIG. 4 shows an illustrative user interface screen displayed on an electronic device that enables users to generate a portion of an example digital media message.

FIG. 4 shows an illustrative user interface 400 that enables the user 116 to generate a digital media message 114. For example, the user interface 400 may be displayed on an electronic device 104 that enables users to generate, create, capture, search for, and/or select digital content segments 112, and to generate and/or consume digital media messages 114. As noted above, such digital content segments 112 may comprise digital video segments (including both audio and video portions or tracks), digital audio segments, digital photos or images, and/or other types of digital content. The user interface 400 may be displayed, for example, on a display 402 of the electronic device 104. In some examples, the user interface 400 may be a web page that is presented to the user 116 via a web browser on the electronic device 104. Alternatively, the user interface 400 may be an interface generated and provided by the content display module 308 as part of a digital media message generation application operating locally on the electronic device 104. For the duration of this disclosure, example embodiments in which the user interface 400 is generated and provided by the content display module 308 and/or other components of the media message engine 108 as part of a digital media message generation application operating locally on the electronic device 104 will be described unless otherwise noted.

As shown, the media message engine 108 may present a user interface 400 that includes a first portion 404 displaying text 406(1), 406(2) . . . 406(N) (collectively "text 406"), images, video, or other like content. The user interface 400 may also include a second portion 408 providing one or more controls, images, thumbnails, or other content or devices configured to assist the user 116 in generating a digital media message 114. In example embodiments, one or more such images, thumbnails, or other content or devices may alternatively be provided in the first portion 404.

Further, in some examples the text 406 provided in the first portion 404 may comprise text 406 of a script (e.g., "script text 406") of the digital media message 114 being created by the user 116. For example, the electronic device 104 may receive a desired script of the digital media message 114 from the user 116 or from another source. In some embodiments, the user 116 may dictate, type, and/or otherwise provide text 406 of the script to the electronic device 104 via one or more of the display 402 and/or the various user interface devices 316 described herein. For example, the user 116 may type text 406 of the script using a physical keyboard connected to the electronic device 104. Alternatively, the user 116 may type text 406 of the script using a virtual keyboard displayed on the display 402. In examples in which the user 116 types the text 406 of the script, the electronic device 104 may directly receive the text 406 of the script from the user 116. Alternatively, in examples in which the user 116 dictates the text 406 of the script, a microphone, audio sensor, and/or other user interface device 316 of the electronic device 104 may receive voice and/or other audio input from the user 116 (e.g., the dictation). The user interface device 316 may direct such input to the voice recognition module 314, and in response, the voice recognition module 314 may generate the text 406 of the script, based on such input. As shown in FIG. 4, the text 406 may include and/or may be separated into separate sentences, sentence fragments, groups of sentences, or other different parts. For example, the text 406(1) may be displayed as being separate from the text 406(2) and so on. While the text 406(1), 406(2) . . . 406(N) comprises complete individual sentences, in other embodiments, at least one of the separate parts of the text 406 may include a sentence, a sentence fragment, a groups of sentences, and/or a combination thereof.

Additionally, as will be described below, the electronic device 104 may provide the text 406 of the script to the user 116 via the display 402 while capturing, recording, and/or otherwise receiving a digital video segment or other such digital content segment 112. In such examples, the received digital video segment may comprise video of the user 116 reading the text 406 of the script. Thus, in some examples, the content of the received digital video segment may be based on the script and/or the text 406, anti at least one of the individual parts of the text 406 may correspond to a respective portion of a digital video segment.

As will be described in greater detail below, the media message engine 108 may receive input from a user 116 of the electronic device 104 via either the first portion 404 or the second portion 408. In some embodiments, such input may comprise one or more gestures, such as a touch command, a touch and hold command, a swipe, a single tap, a double tap, or other gesture. Receipt of such an input may cause the media message engine 108 to capture and/or otherwise receive a first digital content segment 112 via, for example, the camera or other user interface device 316 of the electronic device 104. In such embodiments, the received digital content segment 112 may be displayed within the first portion 404 as the content segment 112 is being recorded and/or otherwise captured by the camera. The media message engine 108 may also associate the digital content segment 112 with a desired position in a play sequence of a digital media message 114, and may direct the digital content segment 112 to a portion of the memory 304 for storage.

The various controls of the user interface 400 may be configured to assist the user 116 in capturing one or more digital content segments 112, modifying one or more of the digital content segments 112, and/or generating one or more digital media messages 114. For example, the user interface 400 may include a menu control 410 configured to provide the user 116 with access to, for example, a user profile, different drafts of various digital media messages 114, and/or to photo or video libraries stored in the memory 304. Additionally, the user interface 400 may include a preview and/or share control 412 configured to control the content display module 308 to provide one or more draft digital media messages 114, or one or more such messages that is in the process of being generated, to the user 116 for viewing via the display 402. The control 412 may also control one or more components of the media message engine 108 to enable sharing of the digital media message 114 being previewed with users 120 of remote electronic devices 118 via one or more components of the media message engine 108. The user interface 400 may further include a user interface device control 414 configured to control one or more operations of a user interface device 316 of the electronic device 104. For example, the user interface device control 414 may be configured to control activation of one or more cameras, microphones, or other components of the device 104. In particular, the user interface device control 414 may be configured to select and/or toggle between a first camera of the electronic device 104 on a first side of the electronic device 104 (e.g., facing toward the user 116) and a second camera on a second side of the electronic device 104 opposite the first side (e.g., facing away from the user 116).

The user interface 400 may also include a plurality of additional controls including one or more navigation controls 416 and/or one or more editing controls 418. For example, the user interface 400 may include a navigation control 416 that, upon selection thereof by the user 116, may enable the user to browse backward or forward between different user interfaces 400 while generating a digital media message 114. For example, a first navigation control 416 may comprise a "back" control while a second navigation control 416 may comprise a "forward" control.

Additionally, one or more of the editing controls 418 may enable a user 116 to add, remove, cut, paste, draw, rotate, flip, shade, color, fade, darken, and/or otherwise modify various aspects of the digital media message 114 and/or various digital content segments 112. For example, one or more of the editing controls 418 may comprise an "undo" control that enables the user 116 to cancel the last action performed via the user interface 400. In some embodiments, the actuation of the editing control 118 may enable the user 116 to delete and/or otherwise remove one or more digital content segments 112 from a play sequence of the digital media message 114. Although a variety of different controls have been described above with regard to the user interface 400, it is understood that in further example embodiments one or more additional controls may be presented to the user 116 by the media message engine 108. For example, such editing controls 418 may further comprise any audio, video, image, or other editing tools. In some examples, at least one of the controls described herein may be configured to modify a first digital content segment 112 before a second, third, or other additional digital content segment 112 is captured and/or otherwise received by the media message engine 108.

Additionally, the user interface 400 may include a capture control 420 configured to receive one or more inputs from the user 116 and to capture one or more digital content segments 112 in response to such input. For example, a finger or other part of a hand 422 of the user 116 may provide a tap, touch, swipe, touch and hold, and/or other type of input via the capture control 420 and/or at other locations on either the first portion 404 or the second portion 408. In response to receiving such input, the capture control 420 may direct one or more signals corresponding to and/or otherwise indicative of such input to the user interface module 310. The user interface module 310 and/or other components of the media message engine 108, either alone or in combination with the processor 302, may direct the camera and/or other user interface device 316 to capture one or more digital content segments 112 in response to such input. Such digital content segments 112 may then be stored automatically in the memory 304 for use in generating one or more digital media messages 114. For example, a first touch input received via the capture control 420 may start a record or capture operation performed by the user interface device 316, and a second touch input received via the capture control 420 may cause a first portion of the digital video segment to be formed while recording continues. This process may be repeated multiple times to create multiple consecutive portions of a digital video segment. In such examples, a double tap or other input received via the capture control 420 may stop an ongoing capture operation. In an example embodiment, the user interface 400 may also include a timer 424 configured to provide visual indicia indicative of one or more aspects of the digital content segment 112 and/or of the digital media message 114. For example, the timer 424 may display an elapsed time of a digital content segment 112 that is being captured and/or that is being played via the display 402.

As noted above, the text 406 may include individual portions or parts 406(1), 406(2) . . . 406(N), and in some examples the script text 406 may be divided into one or more such parts 406(1), 406(2) . . . 406(N) in response to corresponding inputs received from the user 116 via the capture control 420 or via one or more user interface devices 314 of the electronic device 104. For example, in embodiments in which the user 116 types ad/or otherwise enters the text 406 directly via a keyboard or other like user interface device 314, the user 116 may control the content display module 108 and/or other components of the message generation engine 108 to separate the text 406 into such parts 406(1), 406(2) . . . 406(N) by pressing a "return" key or other like key of the keyboard. Alternatively, in embodiments in which the user 116 enters the text 406 via the microphone or other user interface devices 314, such as by dictation, the user 116 may control the content display module 108 and/or other components of the message generation engine 108 to separate the text 406 into such parts 406(1), 406(2) . . . 406(N) by providing consecutive touch inputs via the capture control 420. For example, a first touch input may begin recording such dictation, and a second consecutive touch input may form a break in the text 406, thereby separating the text 406 into a first part 406(1) and a second part 406(2) consecutive to the first part 406(1).

The user interface 400 may also include one or more controls 426 configured to assist the user 116 in transitioning to a next stage of digital media message generation. For example, the control 426 may initially not be displayed by the display 402 while a first digital content segment 112 is being recorded. Once recording of the first digital content segment 112 is complete, the other hand, such as when an input is received via the capture control 420 stopping recording, the control 426 may appear on the display 402. The control 426 may be operable as a "continue" control configured to enable the user 116 to access a further user interface in which the electronic device 104 may record and/or otherwise capture one or more additional digital content segments 112, such as a digital video segment. In some examples, the control 426 may be operable to enable the user 116 to access a plurality of digital content segments 112 for incorporation into the digital media message 114. In further examples, the control 426 may also be operable to provide the user 116 with access to one or more folders, libraries, or other digital content sources within which a plurality of digital content segments 112 are stored.

Figure 5:
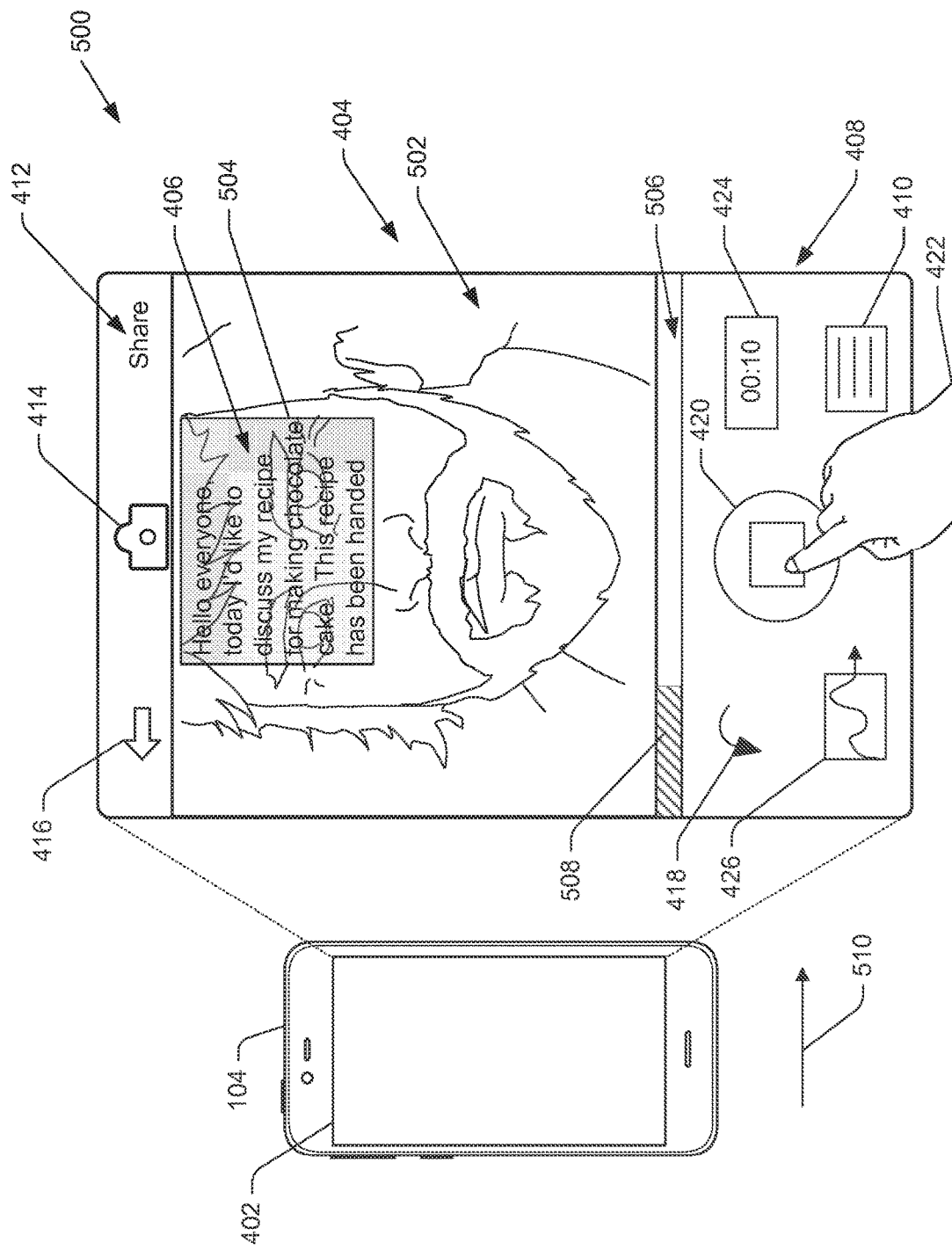
FIG. 5 shows another illustrative user interface screen displayed on an electronic device that enables users to generate a portion of an example digital media message.

The electronic device 104 may also be configured to record, capture, and/or otherwise receive a digital video segment or other digital content segment 112 that is based at least partly on the script described above. For example, FIG. 5 illustrates a user interface 500 of the present disclosure in which an image 502 is provided by the content display module 308 in the first portion 404. In example embodiments, the image 502 displayed in the first portion 404 may be one or more images, photos, or first frames of a digital video segment stored in the memory 304 of the electronic device 104. Alternatively, the content display module 308 may present one or more images 502 in the first portion 404 that are obtained in real time via, for example, a camera or other user interface device 314 of the electronic device 104. For example, the first portion 404 may provide an image 502 of objects that are within a field of view of the camera.

The user interface 500 may also be configured to provide the text 406 of the script in order to assist the user 116 in generating a corresponding digital media message 114. For example, the user interface 500 may include one or more windows 504 configured to provide the text 406. In some embodiments, the text 406 may be provided via the window 504 in response to a touch input or other input received from the user 116, such as via the capture control 420 or other controls described herein. Additionally, the text 406 may remain stationary in the window 504, may scroll from top to bottom within the window 406, or may be displayed in any other format. For example, the text 406 may be displayed in a scrolling manner within the window 504 at a default constant scrolling speed. The user 116 may increase or decrease the scrolling speed via a dedicated scrolling speed control associated with the window 504 or other control of the user interface 500. Alternatively, in other embodiments the user 116 may manually scroll and/or otherwise advance the text 406 via one or more scroll bars or other controls associated with the window 504. In any of the embodiments described herein, the content display module 308 and/or the message generation engine 108 may provide the text 406 of the script via the window 504 while the camera or other user interface device 316 is controlled to capture, record, and/or otherwise receive a corresponding digital video segment or other such digital content segment 112. In such examples, a received digital video segment may comprise video of the user 116 reading the text 406 of the script provided via the window 504. Thus, in some examples, the content of the received digital video segment may be based on the script.

Additionally, the digital video segment or other received digital content segment 112 may include a plurality of consecutive portions. In some examples, such portions of the digital video segment may be indicative of desired divisions in the digital media message 114 being generated. Further, such portions may be indicative of one or more potential locations in which the user 116 may wish to add or insert additional digital content segments 112 into a play sequence of the digital media message 114. For example, the user 116 may provide a touch input or a plurality of consecutive touch inputs, such as via the capture control 420, while the digital video segment is being recorded and while the text 406 is being provided via the window 504. In such examples, the message generation engine 108 may form the plurality of consecutive portions of the digital video segment in response to one or more such inputs. For instance, the message generation engine 108 may receive two consecutive touch inputs via the capture control 420 and may, in response, insert a break in the digital video segment. Such a break in the digital video segment may result in the formation of a corresponding portion of the plurality of consecutive portions. In some examples, at least one of the individual parts of the text 406 described above may correspond to a respective portion of the digital video segment.

The example user interface 500 may also include a progress bar 506. In example embodiments, the progress bar 506 may provide visual indicia of, for example, the amount of time elapsed while a digital video segment or other digital content segment 112 is being captured and/or while a captured digital content segment 112 is being played. In some embodiments, the progress bar 506 may be disposed between the first portion 404 and the second portion 408 of the user interface 500. In additional examples, on the other hand, the progress bar 506 may be located at any desirable position on the display 402 to facilitate providing information to the user 116.

The progress bar 506 may include one or more portions 508 or other dynamic visual indicia. For example, the progress bar 506 may be provided via the display 402 while a digital video segment, digital audio segment, or other such digital content segment 112 is being captured. In such embodiments, the progress bar 506 may include visual indicia, such as the at least one portion 508, having a length that changes, in real time, as the digital content segment 112 is being captured. For example, the portion 508 may move or expand in the direction of arrow 510 as a digital content segment 112 is being recorded.

In some embodiments, the progress bar 506 may include a plurality of separate and/or different portions 508, and each respective portion 508 may correspond to a single respective digital content segment 112 of the digital media message 114 being created and/or played. Alternatively, each respective portion 508 may correspond to a single respective portion of the plurality of consecutive portions of the digital video segment. Each of the one or more portions 508 of the progress bar 506 may have a visibly different appearance on the display 402 in order to identify, for example, the location and/or the amount of time associated with the respective portions of the digital video segment. For example, such different portions 508 may be displayed using different colors, different shading, different patterns, or other distinct characteristics. Additionally, in some embodiments the different portions 508 may be separated by at least one break, line, mark, or other visual indicia included in the progress bar 508.

As previously noted, a first digital content segment 112(1) captured by the electronic device 104 while the user interface 500 is operable may comprise a digital video segment. In such examples, the digital video segment may comprise the main, primary, and/or underlying content on which a resulting digital media message 114 will be based. Such a digital video segment may have a total elapsed time, length, or duration that defines the elapsed time of the resulting digital media message 114. The elapsed time of the digital video segment may be displayed by the timer 424, and the length of a portion 508, such as a first portion, of the progress bar 506 may represent the length or duration of the underlying digital video segment. Once recording of the underlying digital video segment has been completed, the control 426 may enable the user 116 to access a plurality of additional digital content segments 112(N) for incorporation into the digital media message 114, and the various additional digital content segments 112(N) may comprise additional or supplemental content that may be incorporated into the digital media message 114 as desired. As will be described below, at least part of the first digital content segment 112(1) (e.g., at least part of the underlying digital video segment) may be supplemented, augmented, overwritten, and/or replaced by such additional digital content segments 112(N) during formation of the digital media message 114. For example, a digital image of a second digital content segment 112(2) may replace at least part of a video track of the first digital content segment 112(1). As a result, the digital image of the second digital content segment 112(2) may be presented simultaneously with a portion of an audio track of the first digital content segment 112(1) corresponding to the replaced portion of the video track.

Figure 6:
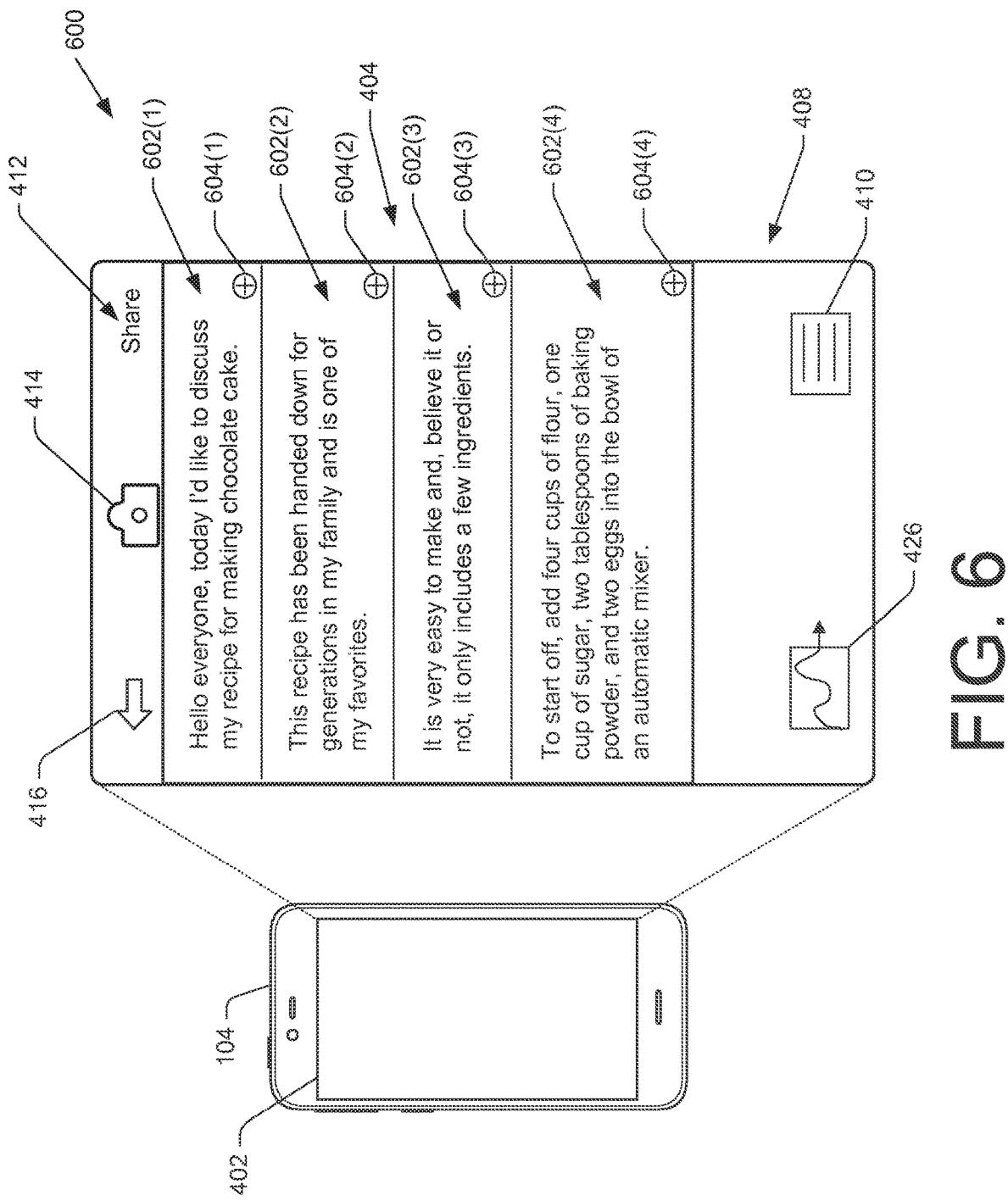
FIG. 6 shows still another illustrative user interface screen displayed on an electronic device that enables users to generate a portion of an example digital media message.

FIG. 6 illustrates another example user interface 600 of the present disclosure. In example embodiments, the media message engine 108 may provide such an example user interface 600 once an underlying digital video segment or other such digital content segment 112 has been received. For example, once a digital video segment has been captured using the user interface 500 of FIG. 5, the message generation engine 108 may determine text 602(1), 602(2), 602(3), 602(4) (collectively "text 602" or "message text 602") of the digital media message 114 being created, and may provide the determined text 602 to the user 116 via the display 402. The text 602 may correspond to respective portions of the underlying digital video segment described above, and in some examples, the text 602 may correspond to respective text 406 of the script. Additionally or alternatively, at least some of the text 602 may vary from the text 406 of the script.

For example, the message generation engine 108 may determine the text 602 of the digital media message 114 by correlating, recognizing, and/or otherwise matching at least part of an audio track of a digital video segment with the text 406 of the script. In such examples, the audio track may be matched with the text 406 of the script based on the elapsed time, sequence, or other characteristics of the audio track, and the matching text 406 of the script may be used and/or provided to the user 116 as text 602 of the digital media message 114 in the user interface 600. In particular, the message generation engine 108 may match individual parts of the text 406 described above with respect to FIG. 4 with corresponding respective portions of the digital video segment described above with respect to FIG. 5. The content display module 308 may cause the matching text 406 of the script to be provided to the user 116 as text 602 of the digital media message 114, and each of the respective portions of the digital video segment may include corresponding text 602.

In some embodiments, text 406 of the script may be matched and/or otherwise associated with more than one portion of the digital video segment. For instance, in the example embodiment of FIG. 6 script text 406(1) and 406(N) have been associated with portions of a digital video segment corresponding to message text 604(1) and 604(4), respectively. Script text 406(2), on the other hand, has been associated with portions of the digital video segment corresponding to message text 604(2) and 604(3). In this example, the user 116 may have formed a first portion of the digital video segment while reading the first sentence of script text 406(2) (corresponding to message text 602(2)), and may have formed a second portion of the digital video segment while reading the second sentence of script text 406(2) (corresponding to message text 602(3)).

In other examples the message generation engine 108 may determine the text 602 of the digital media message 114 by using at least part of the audio track of the digital video segment as an input to the voice recognition module 314 of the electronic device 104. In such examples, the voice recognition module 314 may generate the text 602 of the digital media message 114 as an output, based on the audio track. In the example embodiment shown in FIG. 6, a first portion of the digital video segment (formed in response to consecutive touch inputs received via the capture control 420) may comprise a recording of the user 116 reading script text 406(1). The audio track from the first portion of the digital video segment may be entered as an input to the voice recognition module 314, and the message generation engine 108 may associate the message text 602(1) (e.g., the resulting output of the voice recognition module 314) with the first portion of the digital video segment. A similar process may be repeated when determining text 602(2), 603(3), 602(4).

In each of the embodiments described herein, the text 602 of the digital media message 114 corresponding to the respective consecutive portions of the digital video segment may be provided to the user 116 via the display 402. In some examples, the text 602 may be displayed with lines, boxes, numbering, markings, coloring, shading, or other visual indicia separating various portions of the text 602(1), 602(2), 603(3), 602(4). For example, the text 602(1) corresponding to a first portion of the plurality of consecutive portions may be displayed as being separate from the text 602(2) corresponding to a second portion of the plurality of portions. In some examples, the text 602(1) corresponding to the first portion may be displayed at a first location on the display 402 and the text 602(2) corresponding to the second portion may be displayed at a second location on the display 402 different from the first portion. In such examples, the first, second, and other locations on the display 402 may comprise different respective locations within the first portion 404 or within the second portion 408.

In some examples the message generation engine 108 may cause the user interface 600 to provide one or more controls 604(1), 604(2), 604(3), 604(4) (collectively "controls 604) operable to receive input from the user 116, and to cause the display 402 to provide one or more images corresponding to respective digital content segments 112 at least partly in response to such input. For example, the use interface 600 may include a respective control 604(1), 604(2), 604(3), 604(4) associated with each portion of the plurality of consecutive portions of the digital video segment. Such controls 604(1), 604(2), 604(3), 604(4) may be displayed proximate, at substantially the same location as, and/or otherwise as corresponding to the text 602(1), 602(2), 602(3), 602(4), respectively. In some examples, an input received via one of the controls 604(1), 604(2), 604(3), 604(4) may indicate selection of the corresponding portion of the plurality of consecutive portions of the digital video segment, and may enable the user 116 to edit, modify, augment, re-order, and/or otherwise change the corresponding portion of the digital video segment. In some examples, such a change may include combining the corresponding portion with at least part of an additional digital content segment 112, and such a combination may result in an audio track, a video track, and/or another component of the portion of the digital video segment being replaced by part of the additional digital content segment 112. For example, a first digital content segment 112(1) may comprise a digital video segment, such as the underlying digital video segment described above, and may include an audio track recorded by a microphone of the electronic device 104 and a corresponding video track recorded in unison with the audio track by a camera of the electronic device 104. The media message engine 108 may replace, for example, the video track or the audio track of a first portion of the digital video segment when combining the second digital content segment 112(2) with the first portion of the digital video segment.

In some examples the content interface module 306, content display module 308, and/or other components of the media message engine 108 may segment each digital content segment 112 into its respective components or content types. For example, a digital video segment received by the media message engine 108 may be segmented into an audio track and a separate video track. Some digital content segments 112, such as digital images, audio clips, and the like may be segmented into only a single track/component depending on the content type associated with such digital content segments 112. Once the digital content segments 112(N) have been segmented in this way, the media message engine 108 may replace various tracks of portions of the digital content segments 112 based on an input received from the user 116 during generation of the digital media message 114. In some examples, the media message engine 108 may determine a content type of a selected additional digital content segment 112(2) (e.g., audio, image, video, etc.), and may replace a track of a portion of the underlying digital video segment having substantially the same content type (e.g., an audio track, a video track, etc.).

Figure 7:
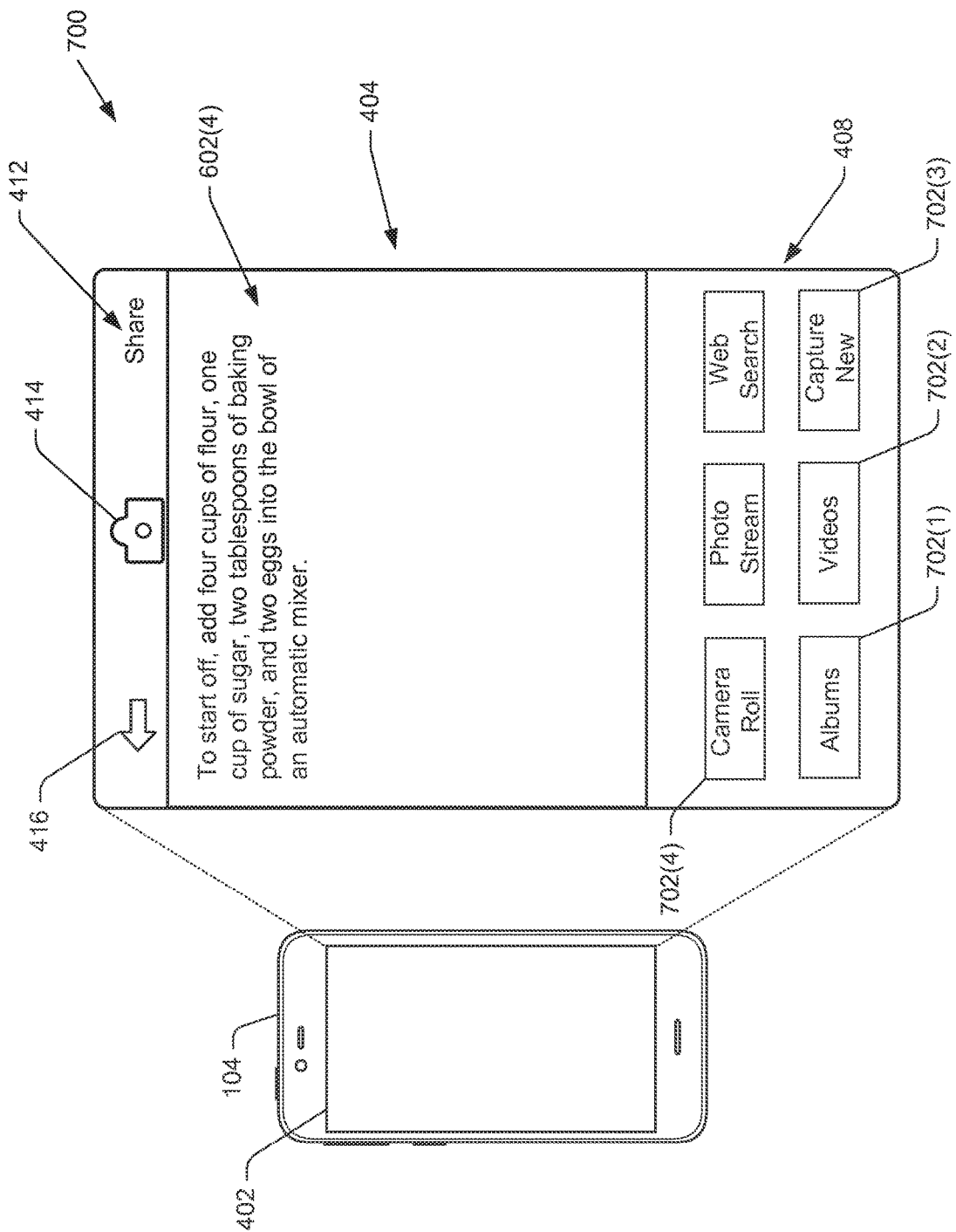
FIG. 7 shows yet another illustrative user interface screen displayed on an electronic device that enables users to generate a portion of an example digital media message.

FIG. 7 illustrates an example user interface 700 in which a portion of a captured digital video segment corresponding to the text 602(4) has been selected. Such a selection may be the result of an input received via, for example, the control 604(4). In particular, the message generation engine 108 may receive a touch input from the user 116 indicating selection of a particular portion of the digital video segment via the control 604(4), and the content display module 308 may cause the text 602(4) corresponding to the selected portion of the digital video segment to be displayed in the first portion 404 of the display 402 at least partly in response to the input. In example, embodiments, such an input may indicate a desire of the user 116 to supplement, augment, overwrite, replace, and/or otherwise modify a portion of the digital video segment corresponding to the text 602(4).

Additionally, the message generation engine 108 may cause a plurality of thumbnails 702(1), 702(2), 702(3), 702(4) (collectively "thumbnails 702") to be displayed and/or otherwise provided via the display 402 at least partly in response to the input. Each thumbnail 702 may correspond to, for example, a different respective digital content source. For example, each thumbnail 702 may be indicative of a respective folder, library, or other source of digital content segments 112. In example embodiments, such digital content sources may include for example, photo libraries, video libraries, photo streams, albums, or other such sources stored locally in the memory 304 or remotely in, for example, the memory 204 of one or more servers 102. Additionally, such sources may include various website or other web-based sources of content.

Each of the thumbnails 702 may be configured to receive a touch input from the user 116 via the display 402. For example, an input received via a first thumbnail 702(1) may control the media message engine 108 to provide the user 116 with access to one or more digital content segments 112 stored in a variety of albums associated with the memory 304. Similarly, input received via one or more of the additional thumbnails 702 may control the media message engine 108 to provide the user 116 with access to one or more digital content segments 112 stored in video libraries, camera rolls, audio libraries, or other sources. Additionally, one or more of the thumbnails 702 may enable the user 116 to capture additional digital content segments 112 using one or more of the user interface devices 316 described above. Further, one or more of the thumbnails 702 may enable the user 116 to perform an Internet search using, for example, a web browser or other component of the media message engine 108. Such thumbnails 702 may be displayed in the second portion 408 of the display 402. Alternatively, at least one of the thumbnails 702 may be displayed and/or otherwise located in the first portion 404. Additionally, in example embodiments the height, width, and/or other configurations of the first portion 404 and/or the second portion 408 may be adjusted by the user 116 to facilitate display of one or more of the thumbnails 702. For example, the user 116 may provide a touch, swipe, touch and hold, and/or other like input to the display 402 in order to modify the relative size of the first and second portions 404, 408.

Figure 8:
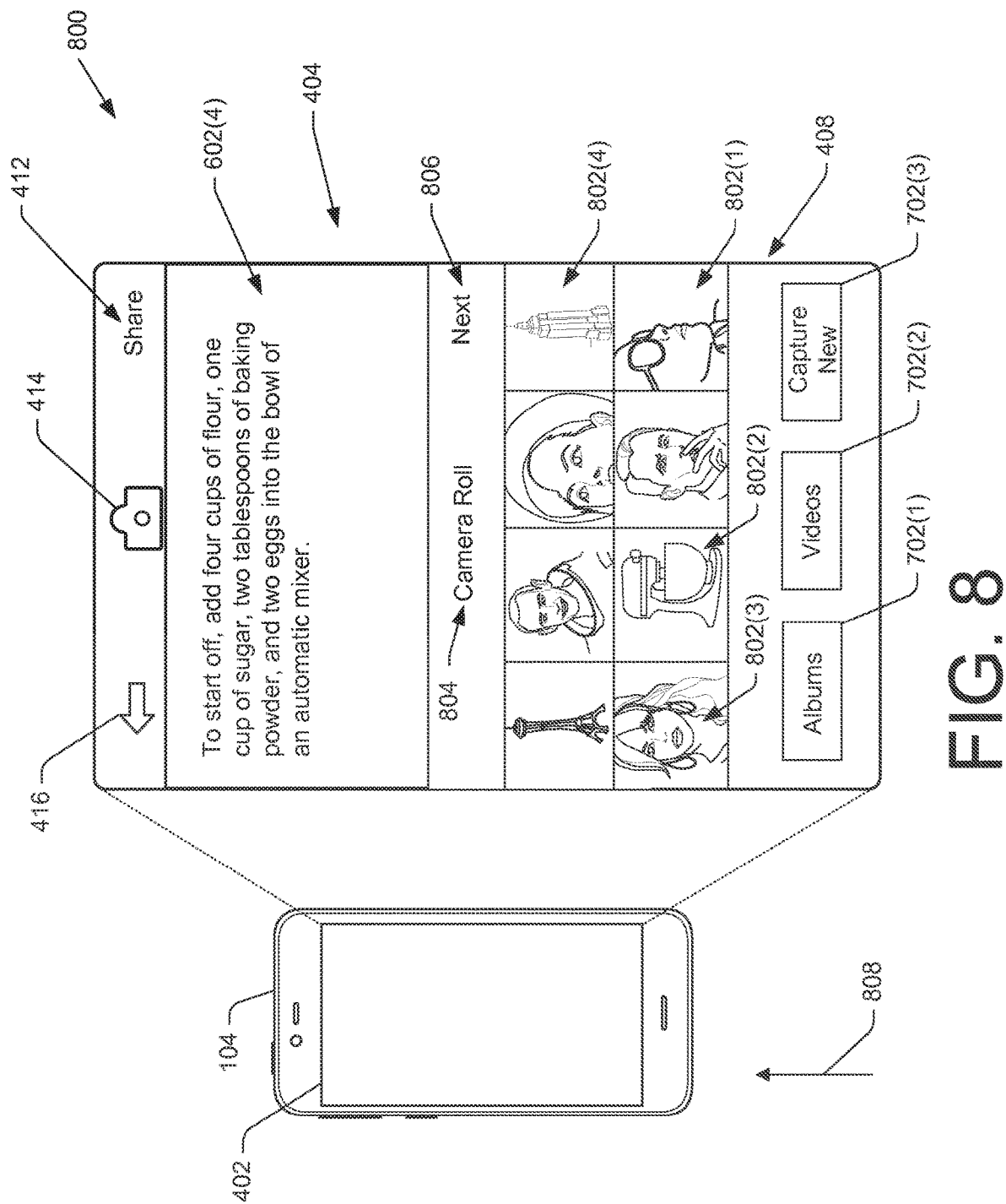
FIG. 8 shows a further illustrative user interface screen displayed on an electronic device that enables users to generate a portion of an example digital media message.

As noted above, an input received via one or more of the thumbnails 702 may provide access to a plurality of images representative of respective digital content segments 112. FIG. 8 illustrates an example user interface 800 of the present disclosure in which the message generation engine 108 has received an input via, for example, the thumbnail 702(4) corresponding to a "camera roll" of the electronic device 104, and in which a plurality of images 802(1)-802(N) (collectively "images 802") have been provided via the display 402 in response. In particular, in response to receiving such an input at the "camera roll" thumbnail 702(4) the media message engine 108 and/or the content display module 308 may control the display 402 to provide a plurality of images 802 corresponding to respective images and/or other digital content segments 112 stored in a camera roll or other portion of the memory 304. In other example embodiments in which an input is received via a different thumbnail 702, on the other hand, the images 802 displayed in the second portion 408 may be representative of digital content segments 112 stored within the particular source identified by the thumbnail 702 receiving the input. For example, in additional embodiments in which an input is received via the "videos" thumbnail 702(2), the media message engine 108 and/or the content display module 308 may control the display 402 to provide a plurality of images 802 corresponding to respective digital video segments and/or other digital content segments 112 stored in a video folder, video library, or other portion of the memory 304.

The example user interface 800 may also include one or more visual indicia 804 indicating, for example, which of the thumbnails 702 has been selected by the user 116, as well as a control 806 operable to transition the user interface 800 to a next phase of a digital media message generation process. For example, the control 806 may comprise a "next" control or other control similar to the navigation control 416 described above.

Additionally, as noted above the shape, size, and/or other configurations of the first and/or second portions 404, 408 of the display 402 may be adjusted by the user 116 in order to facilitate viewing the images 802. For example, the user 116 may provide a touch, swipe, touch and hold, and/or other input within the second portion 408 in the direction of arrow 808. Receiving such an input may cause the content display module 308 and/or the media message engine 108 to increase the size of the second portion 408 relative to the size of the first portion 404. Such an input may, as a result, enable a greater number of the images 802 to be viewed via the second portion 408 of the display 402 while the user interface 800 is operable. Alternatively, receiving a touch, swipe, and/or other input in a direction opposite of arrow 808 may cause the content display module 308 and/or the media message engine 108 to decrease the size of the second portion 408 relative to the size of the first portion 404.

Similar to the thumbnails 702 described above with respect to FIG. 7, the portion of the display 402 providing each of the images 802 may be configured to receive input from the user 116. For example, the electronic device 104 may receive one or more inputs at a location proximate and/or within the second portion 408 of the display 402. Such an input may be received at, for example, a location in the second portion 408 where a particular image 802 is being displayed. Such an input may be received by the user interface module 310 and/or other components of the media message engine 108 and may be interpreted as indicating selection of a digital content segment 112 associated with the particular corresponding image 802 provided at the location in the second portion 408 at which the input was received. Selecting various digital content segments 112 in this way may assist the user 116 in associating the selected digital content segment 112 with a play sequence of a digital media message 114 being created. In particular, the message generation engine 108 may associate the selected digital content segment 112 with the selected portion of the digital video segment corresponding to the text 602(4) provided in the first portion 404 of the display 402. In some examples, the message generation engine 108 may associate the various portions of the digital video segment as well as the selected digital content segment 112 with the play sequence of the digital media message 114 such that the selected digital content segment 112 will be presented simultaneously with a video track, an audio track, and/or at least some other part of the selected portion of the digital video segment when the digital media message 114 is played.

As noted above, the media message engine 108 may overwrite and/or otherwise replace part of the audio track and/or the video track of a first digital content segment 112(1) with at least part of a second digital content segment 112(2). For example, an image or other component of the second digital content segment 112(2), and the audio track from a second portion of a first digital content segment 112(1) (e.g., a digital video segment) may be combined to form a combined segment of the digital media message 114. In particular, upon receiving one or more inputs described above with respect to FIGS. 6-8, the media message engine 108 may combine the second digital content segment 112(2)

with the audio track of a portion of the digital video segment, and may configure the combined segment such that the audio track of the portion of the digital video segment is presented simultaneously with the image of second digital content segment 112(2) when the digital media message 114 is played.

In some examples, in response to receiving one or more inputs via the display 402, the content display module 308 and/or the media message engine 108 may cause the display 402 to provide one or more visual indicia indicating selection of a digital content segment 112 corresponding to the associated image 802. For example, as shown in the user interface 900 of FIG. 9, in response to receiving an input indicating selection of a particular digital content segment 112, the content display module 308 and/or the media message engine 108 may cause the image (e.g., image 802(2)) corresponding to the digital content segment 112 to be displayed in association with the text 602. In particular, the image 802(2) corresponding to the selected digital content segment 112 may be displayed in association with the particular text 602(4) corresponding to the portion of the digital video segment with which the digital content segment 112 corresponding to the image 802(2) will be associated. Providing the image 802(2) in association with the corresponding text 602(4) in this way may assist the user 116 in visualizing which digital content segments 112 will be associated with which of the various portions of the underlying digital video segment.

Additionally, the user interface 900 may include the control 426 described above configured to assist the user 116 in transitioning to a next stage of digital media message generation. For example, the control 426 may be displayed on the display 402 in response to receiving an input indicating selection of a digital content segment 112 associated with a corresponding image 802(2) of the plurality of images 802. When such an input is received, such as via the portion of the display 402 providing the images 802, the content display module 308 and/or the media message engine 108 may cause the display 402 to provide the control 426. The control 426 may be operable as a "done" control configured to enable the user 116 to finish selecting digital content segments 112 for incorporation into the digital media message 114.

As noted above with respect to at least FIGS. 6-9, the electronic device 104 may enable the user 116 to modify an underlying digital video segment and/or other digital content segment 112 by replacing at least part of an audio track, video track, or other component of the various portions of the digital video segment with an image or other component of an additional digital content segment 112. In additional examples, the electronic device 104 may also enable the user 116 to augment and/or otherwise modify the underlying digital video segment described above without replacing components of the digital video segment. In such additional examples, an additional digital content segment 112 may be selected by the user 116 and added to the underlying digital video segment as a new portion. The additional digital content segment 112 may be combined with and/or otherwise added to the underlying digital video segment at any location, and such an addition may increase the overall elapsed time of the digital video segment, as well as the resulting total elapsed time of the digital media message 114.

Figure 9:
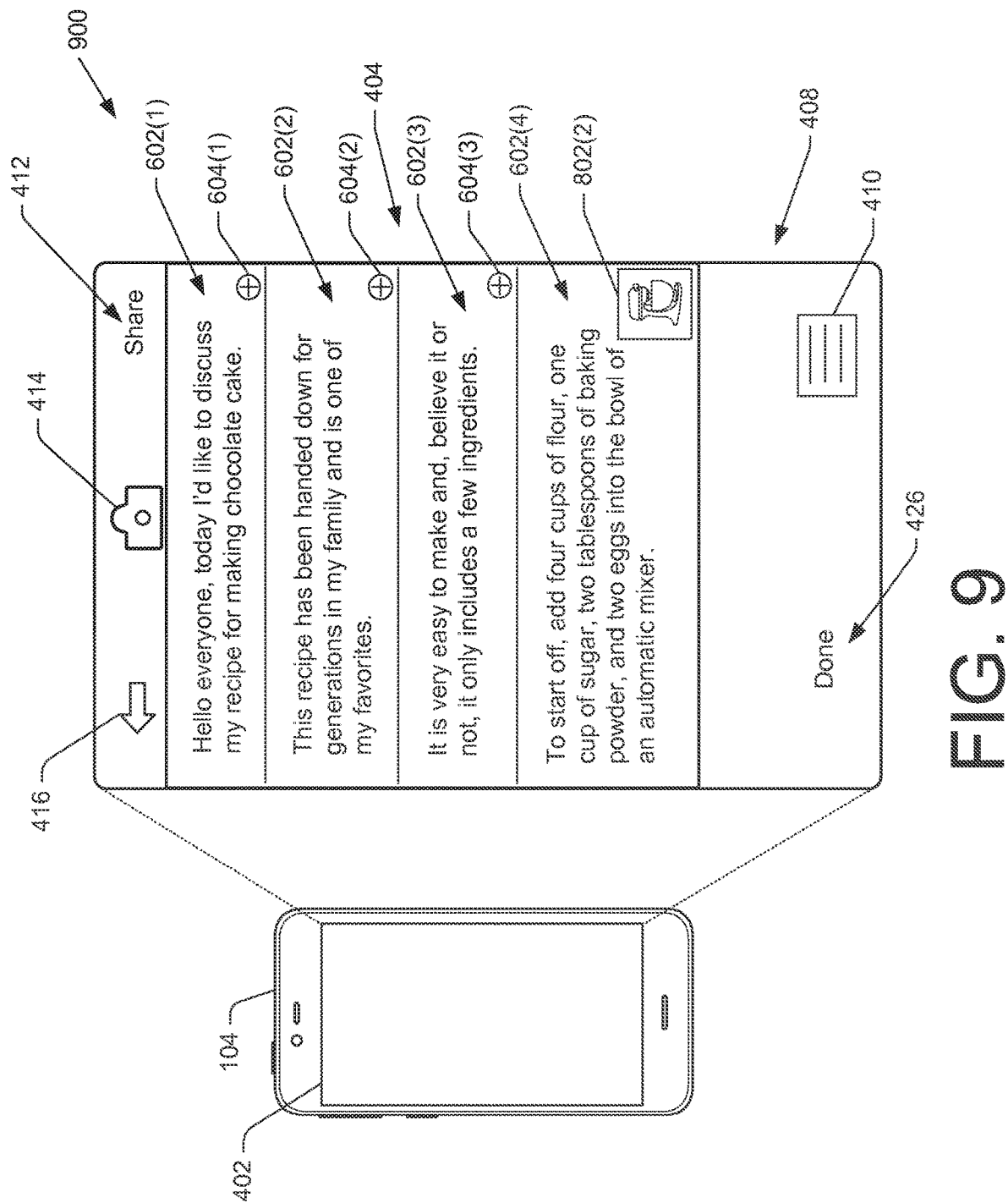
FIG. 9 shows another illustrative user interface screen displayed on an electronic device that enables users to generate a portion of an example digital media message.
Figure 10:
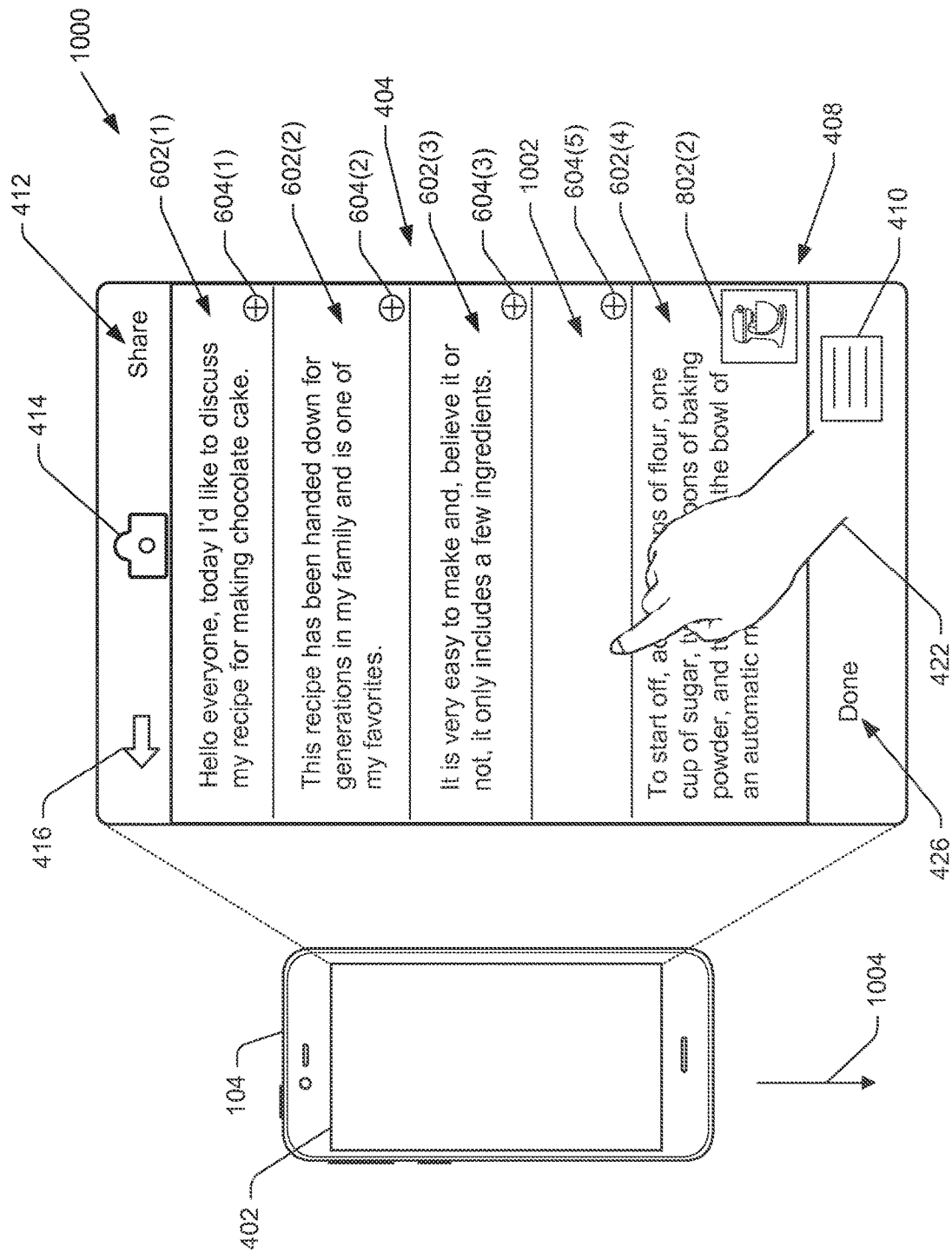
FIG. 10 shows still another illustrative user interface screen displayed on an electronic device that enables users to generate a portion of an example digital media message.

As shown in the user interface 1000 of FIG. 10, the user 116 may provide an input via the first portion 404, such as a touch input, a touch and hold input, a swipe input, a touch and drag, input, and/or other input. In one example, the user 116 may designate a location in a play sequence of the digital media message 114 for inserting an additional digital content segment 112 by providing an input at a corresponding location 1002 in the first portion 404 of the display 402. For example, the first portion 404 may display text 602 corresponding to each respective portion of the plurality of consecutive portions of the digital video segment, and such text 602 may be displayed with visual indicia separating various portions of the text 602. For example, visible separation of the text 602(1), 602(2), 602(3), 602(4) may correspond to the start or end points of corresponding portions of the underlying digital video segment. To insert an additional digital content segment 112 at a location in the play sequence between two consecutive, sequential, and/or adjacent portions of the digital video segment, the user 116 may provide an input at a corresponding location 1002 on the display 402. In the example, shown in FIG. 9, a user 116 wishing to insert an additional digital content segment 112 at a location in the play sequence between adjacent portions of the digital video segment corresponding to the text 604(3) and text 604(4) may touch the display 402 proximate the location 1002 (e.g., proximate a location on the display 402 displaying either the text 604(3) or text 604(4)) and may drag a finger of the user's hand 422 in the direction of arrow 1004. Upon receiving such an input, the content display module 308 and/or other components of the message generation engine 108 may at least temporarily display a corresponding empty space at the location 1002. In such examples, the empty space at the location 1002 may designate the location in the play sequence at which an additional digital content segment 112 will be added.

The additional digital content segment 112 may, for example, be presented consecutive with and separate from the adjacent portions of the digital video segment when the digital video message 114 is played. For example, in the embodiment of FIG. 9, an additional digital content segment 112 added at a location of the play sequence corresponding to the location 1002 may be presented immediately after and separate from a portion of the digital video segment to which the text 602(3) corresponds. The additional digital content segment 112 added at the location of the play sequence corresponding to the location 1002 may also be presented immediately before and separate from a portion of the digital video segment to which the text 602(4) corresponds. In such examples, the additional digital content segment 112 added to the play sequence may comprise, among other things, a digital audio segment, a digital video segment and/or any other digital content segment 112 having a respective elapsed time. Additionally, the additional digital content segment 112 may include an audio track, a video track, and/or any other components.

The user interface 1000 may also include at least one control 604(5) associated with the location 1002. In such embodiments, the control 604(5) may be substantially similar to the controls 604 described above. For example, the control 604(5) may be operable to receive input from the user 116, and to cause the display 402 to provide one or more images corresponding to respective digital content segments 112 at least partly in response to such input. For example, as described above with respect to at least FIGS. 6 and 7 the message generation engine 108 may receive a touch input from the user 116 via the control 604(5), and the message generation engine 108 may cause the thumbnails 702 described above to be displayed and/or otherwise provided via the display 402 at least partly in response to the input. Each thumbnail 702 may correspond to, for example, a different respective digital content source. As noted with respect to at least FIGS. 7 and 8, in response to receiving an input at one of the thumbnails 702 the media message engine 108 and/or the content display module 308 may control the display 402 to provide a plurality of images 802 corresponding to respective images and/or other digital content segments 112 stored within the particular content source identified by the thumbnail 702 receiving the input.

The electronic device 104 may also receive a further input at, for example, a location in the second portion 408 where a particular image 802 is being displayed. Such an input may be received by the user interface module 310 and/or other components of the media message engine 108 and may be interpreted as indicating selection of an additional digital content segment 112 associated with the particular corresponding image 802 provided at the location in the second portion 408 at which the input was received. The message generation engine 108 may associate, add, and/or otherwise insert the additional digital content segment 112 associated with the particular image 802 into the play sequence of the digital media message 114 as noted above with respect to FIG. 10.

Figure 11:
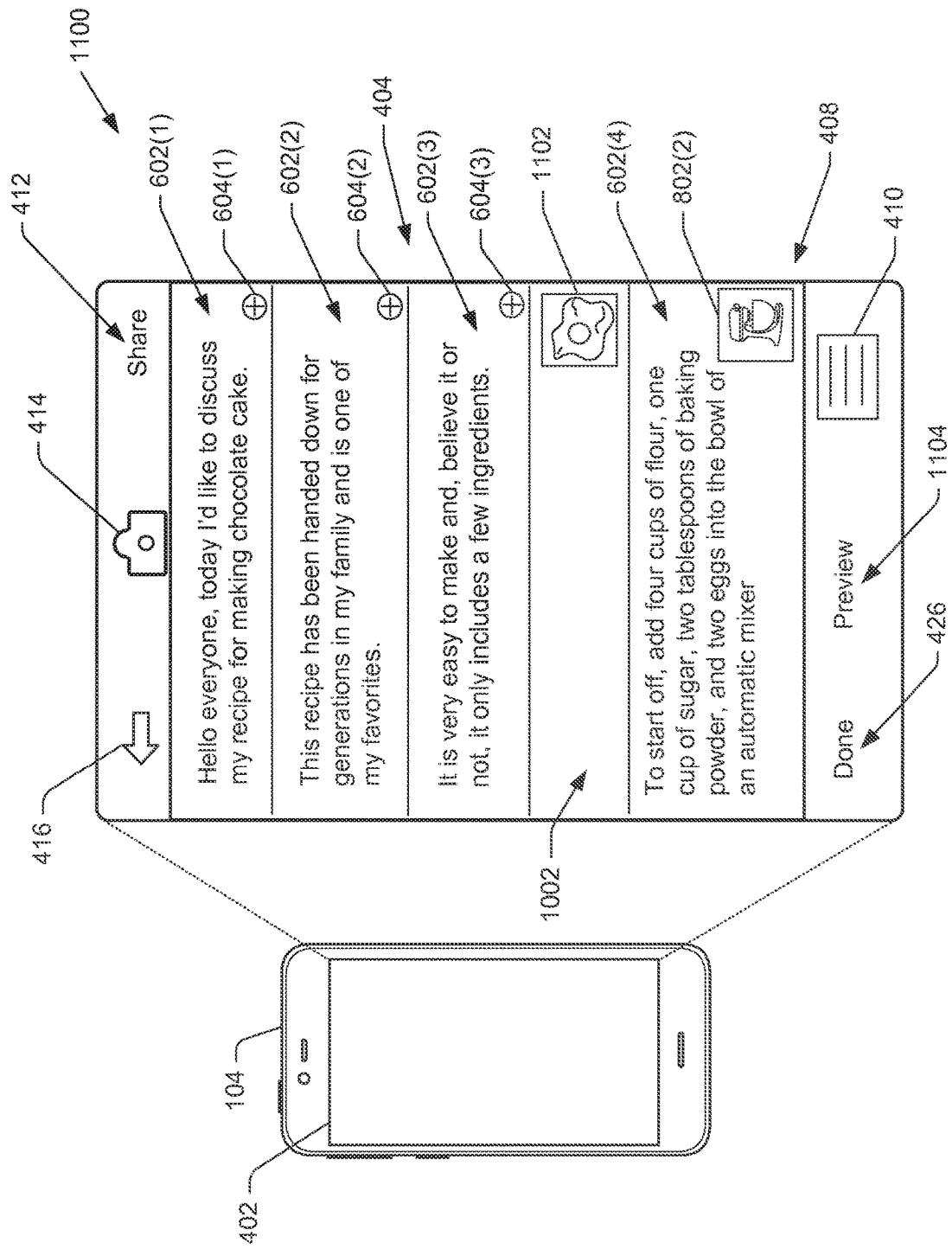
FIG. 11 shows yet another illustrative user interface screen displayed on an electronic device that enables users to generate a portion of an example digital media message.

Additionally, the content display module 308 and/or other components of the media message engine 108 may provide visual indicia via the display 402 indicating that the additional digital content segment 112 associated with the particular image 802 has been inserted into the play sequence of the digital media message 114. For example, as show in the user interface 1100 of FIG. 11, the content display module 308 may cause the display 402 to provide the image corresponding to the additional digital content segment 112, and the image (shown as image 1102 in FIG. 11) may be displayed at the location 1002 described above. Providing the image 1102 in this way may assist the user 116 in visualizing which additional digital content segment 112 will be inserted into the play sequence adjacent one or more of the various portions of the underlying digital video segment.

The example user interface 1100 may also include a preview control 1104 operable to provide a preview of the digital media message 114 via the display 402 for review by the user 116. For example, the preview control 1104 may be configured to receive one or more touch inputs from the user 116, and the content display module 308 and/or the media message engine 108 may cause the electronic device 104 to display a preview of the digital media message 114 in response to such input. For example, in response to receiving an input via the preview control 1104, the content display module 308 may cause the display to provide the example user interface 1200 shown in FIG. 12 in which the digital media message 114 may be provided to the user 116 for review and editing.

The user interface 1200 may include, among other things, a search control 1202 operable to enable the user 116 to conduct one or more web-based searches for additional digital content. The user interface 1200 may also include an audio selection control 1204 configured to enable the user 116 to add audio clips or other such digital media to a digital media message 114 currently under creation. Further, the user interface 1200 may include an editing control 1206 substantially similar to the control 418 described above with respect to FIG. 4, and a play/pause control 1208 configured to control the playback and/or previewing of a draft digital media message 114. Each of the controls 1202, 1204, 1206, 1208 may be configured to receive one or more touch inputs from the user 116, and the content display module 308 and/or the media message engine 108 may cause the electronic device 104 to perform any of the functions described above with respect to the respective controls 1202, 1204, 1206, 1208 in response to such input.

The user interface 1200 may also include the progress bar 506 described above. The progress bar 506 may be useful in providing visual indicia of the elapsed playtime of the digital media message 114 being created. The progress bar 506 may also enable the user 116 to visualize various different portions of the digital media message 114 and, in particular, to visualize the various locations within the digital media message 114 at which different digital content segments 112 are located and/or have been added. For example, the progress bar 506 may include a play marker 1210 that moves in real time, in the direction of arrow 510, as the draft digital media message 114 is played. The progress bar 506 may also include a plurality of separate and distinct portions 1212(1)-1212(4) (collectively "portions 1212"). Taken together, the plurality of portions 1212 may provide visual indicia of a play sequence of the digital media message 114 currently being generated. The progress bar 506 may further include a break 1214 and/or other visual indicia separating each of the portions 1212.

Each respective portion 1212 of the progress bar 506 may correspond to and/or be indicative of a respective location in and/or portion of such a play sequence. Additionally, one or more digital content segments 112 may be associated with each portion 1212 of the progress bar 506. For example, each portion of an underlying digital video segment of the digital media message 114 may correspond to and/or be associated with a respective one of the portions 1212 of the progress bar 506. Likewise, one or more additional digital content segments 112 combined the digital video segment as described herein with respect to at least FIGS. 6-9, and/or inserted into the play sequence as described herein with respect to at least FIGS. 10 and 11, may correspond to and/or be associated with a respective one of the portions 1212.

As a result, the progress bar 506 may indicate the order and the elapsed time in which each of the digital content segments 112 will be played and/or otherwise presented. In example embodiments, size, length, and/or other configurations of each portion 1212 may be indicative of such an elapsed time. Further, the arrangement of each portion 1212 from left to right along the display 402 may be indicative of such an order. Thus, the full length of the progress bar 506 may be representative of the full duration and/or elapsed time of an underlying digital video segment or other first digital content segment 112(1), and any additional digital content segments 112(N) that have been combined with the first digital content segment 112(1). For example, when the first digital content segment 112(1) comprises a digital video segment, the lull length of the progress bar 506 may represent the total elapsed time of the digital video segment.

Figure 13:
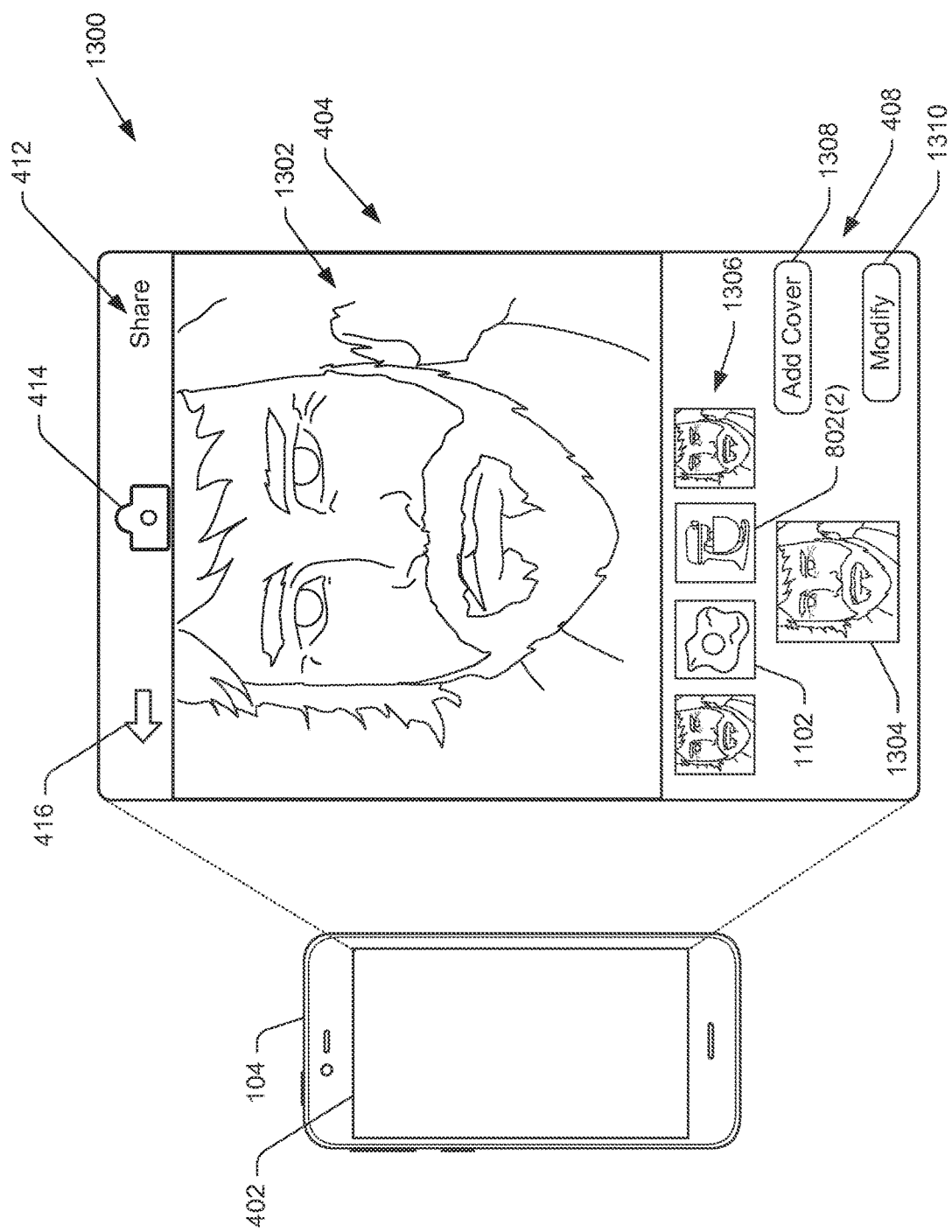
FIG. 13 shows yet another illustrative user interface screen displayed on an electronic device that enables users to generate a portion of an example digital media message.

FIG. 13 illustrates another example user interface 1300 of the present disclosure. In example embodiments, the media message engine 108 may provide such an example user interface 1300 in response to receiving one or more inputs via one or more of the controls described above. For example, the media message engine 108 may receive a touch input or other such input indicating selection of the share control 412. In response to receiving such an input, the media message engine 108 may provide an image 1302 via the display 402. Such an image 1302 may comprise, for example, one or more images, photos, or first frames of a digital video segment stored in the memory 304 of the electronic device 104. Alternatively, the content display module 308 may present one or more images 1302 in the first portion 404 that are obtained in real time via, for example, a camera or other user interface device 316 of the electronic device 104. For example, the first portion 404 may provide an image 1302 of objects that are within a field of view of the camera.

The media message engine 108 may also provide a message thumbnail 1304 via the display 402. In example embodiments, such a message thumbnail 1304 may be similar to one or more of the images 802 described above. In some examples, however, the message thumbnail 1304 may be larger than one or more of the images 802, and/or may have one or more visual characteristics (e.g., highlighting, shading, a label, a frame, etc.) configured to enable the user 116 to distinguish the message thumbnail 1304 from one or more images 802 concurrently displayed in, for example, the second portion 408. For example, the message thumbnail 1304 may be provided at the second portion 408 of the display 402 simultaneously with visual indicia 1306 indicative of the play sequence of the digital media message 114. In example embodiments, the visual indicia 1306 of the play sequence may include the images 802, digital video segments, and/or other portions included in the play sequence, arranged in the order in which such content will appear when the digital media message 114 is played. In such embodiments, the message thumbnail 1304 may be disposed above, beneath, to the side of, and/or at any other location on the display 402 relative to the visual indicia 1306 of the play sequence such that the user 116 may easily identify the message thumbnail 1304 as being distinct from the images 802 and/or other components of the visual indicia 1306. In example embodiments, the message thumbnail 1304 may comprise, for example, a first frame and/or any other image or content indicative of the digital media message 114 being generated by the user 116. As a result, it may be desirable for the media message engine 108 to present the message thumbnail 1304 with one or more visual characteristics enabling the user 116 to identify the message thumbnail 1304 with relative ease.

The example user interface 1300 may also include one or more additional controls configured to assist the user 116 in making further modifications to one or more of the digital content segments 112, the play sequence, and/or other components of the digital media message 114. For example, the user interface 1300 may include a control 1308 configured to enable the user 116 to add one or more cover images, cover videos, cover photos, and/or other content to the digital media message 114. In example embodiments, the media message engine 108 may receive an input, such as a touch input, indicative of selection of the control 1308 by the user 116. In response to receiving such an input, the media message engine 108 may enable the user 116 to browse various photos, images, videos, and/or other content stored in the memory 304 and/or in the memory 204 of the server 102. Additionally and/or alternatively, in response to receiving such an input, the media message engine 108 may enable the user 116 to perform a web-based search, such as via one or more search engines or applications of the electronic device 104, for such content. The user 116 may be permitted to select one or more such content items for use as, for example, a cover image and/or other indicator of the digital media message 114 currently being generated. Upon selection of such a content item, the media message engine 108 may add the selected item to the play sequence of the digital media message 114 and/or may combine the selected item with one or more content segments 112 of the digital media message 114.

The user interface 1300 may further include one or more controls 1310 configured to enable the user 116 to modify one or more of the digital content segments 112, the play sequence, and/or other components of the digital media message 114. Such controls 1310 may comprise, among other things, any audio, video, image, or other editing tools known in the art. In example embodiments, such controls 1310 may provide editing functionality enabling the user 116 to delete, move, modify, augment, cut, paste, copy, save, or otherwise alter portions of each digital content segment 112 as part of generating a digital media message 114. Additionally, one or more of the controls 1310 may enable a user 116 to add, remove, cut, paste, draw, rotate, flip, shade, color, fade, darken, and/or otherwise modify various aspects of the digital media message 114 and/or various digital content segments 112 included in the play sequence thereof. In some embodiments, at least one of the controls 1310 may be similar to and/or the same as one or more of the controls 418 described above.

Additionally, the user interface 1300 may include one or more additional controls (not shown) configured to enable the user 116 to add one or more audio clips, segments, files, and/or other content to the digital media message 114. In example embodiments, the media message engine 108 may receive an input, such as a touch input, indicative of selection of such a control by the user 116. In response to receiving such an input, the media message engine 108 may enable the user 116 to browse various audio files and/or other content stored in the memory 304 and/or in the memory 204 of the server 102. Additionally and/or alternatively, in response to receiving such an input, the media message engine 108 may enable the user 116 to perform a web-based search, such as via one or more search engines or applications of the electronic device 104, for such content. The user 116 may be permitted to select one or more such content items, and upon selection of such a content item, the media message engine 108 may add the selected item to the play sequence of the digital media message 114 and/or may combine the selected item with one or more content segments 112 of the digital media message 114.

Figure 14:
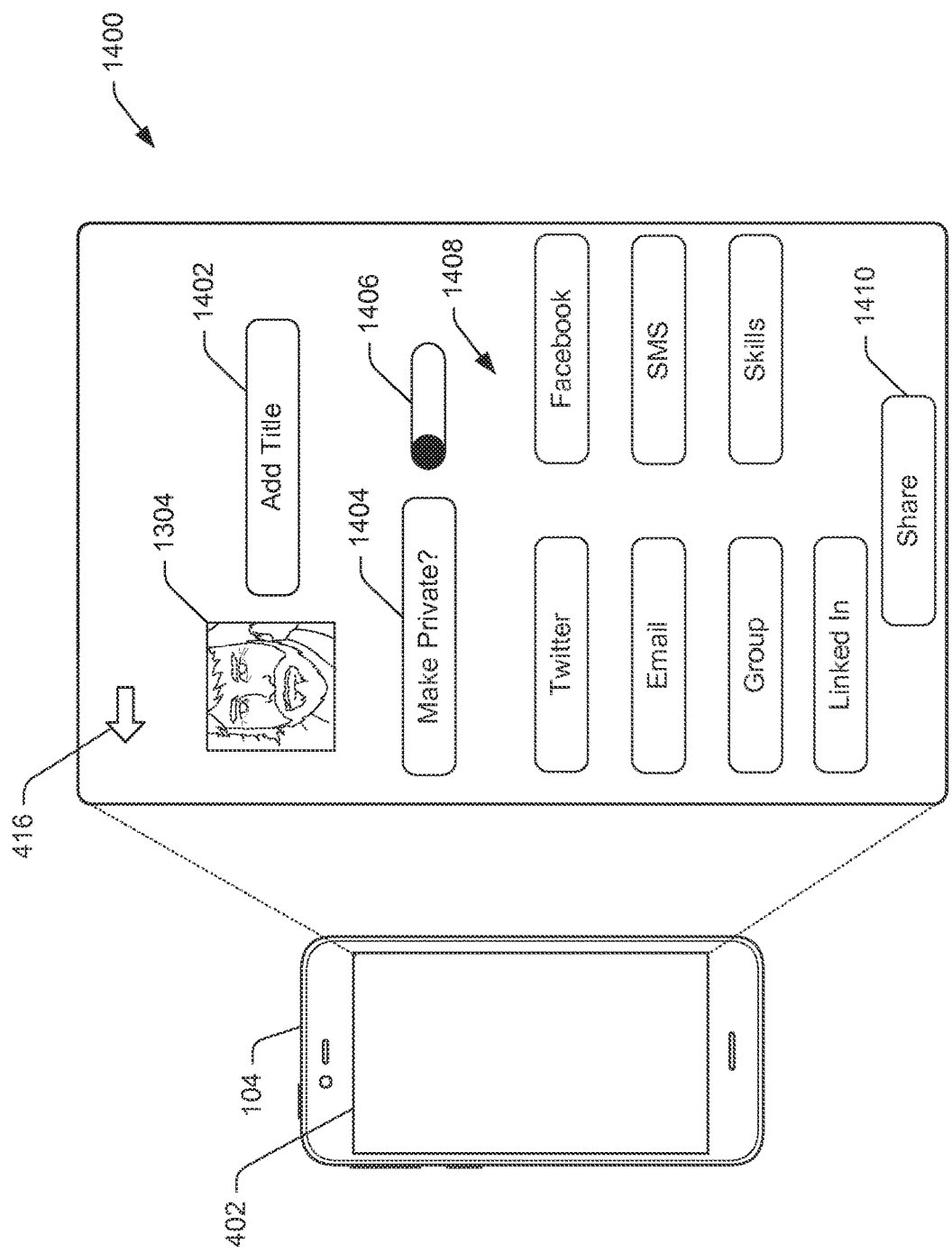
FIG. 14 shows an illustrative user interface screen displayed on an electronic device that enables users to share an example digital media message.

The user interface 1300 may also include the share control 412 and/or the next/done control 426 described above. Upon selection of such a control by the user 116, the media message engine 108 may enable the user 116 to browse forward to a next user interface configured to assist the user 116 in generating, modifying, and/or sharing the digital media message 114. For example, the media message engine 108 may receive an input, such as a touch input, indicating selection of the share control 412 by the user 116. In response to receiving such an input, the media message engine 108 may provide the example user interface 1400 illustrated in FIG. 14. Such an example user interface 1400 may include, among other things, the message thumbnail 1304 indicating and/or otherwise identifying the digital media message 114 that the user 116 desires to share. Such an example user interlace 1400 may also include a plurality of controls configured to assist the user 116 in providing the digital media message 114 for sharing with, for example, a remote electronic device 118, such as via the network 106. For example, one or more of the controls 1402 may enable the user 116 to add a title, a name, and/or other identifier to the media message 114 such that the media message 114 may be easily recognizable and/or identifiable by one or more users 120 of the remote electronic device 118. In some examples, the title and/or other identifier added to the media message 114 may be provided to the user 120 simultaneously and/or otherwise in conjunction with the digital media message 114 when the user 120 consumers at least a portion of the digital media message 114 on the remote electronic device 118.

In addition, the user interface 1400 may include one or more controls 1404, 1406 configured to enable the user 116 to privatize the digital media message 114 prior to providing the digital media message 114 for sharing with a remote electronic device 118. For example, one or more such controls 1404 may enable the user 116 to encrypt and/or otherwise configure the digital media message 114 such that only an approved user 120 or plurality of users 120 may receive and/or access the digital media message 114. In example embodiments, the media message engine 108 may receive an input, such as a touch input, indicating selection of the control 1404 by the user 116. In response to receiving such an input, the media message engine 108 may enable the user 116 to browse, for example, an address book or other like directory stored in the memory 304 of the electronic device 104 and/or in the memory 204 of the server 102. Upon browsing such a directory, the user 116 may select one or more contacts approved by the user 116 to have access to the digital media message 114. Additionally and/or alternatively, in response to receiving such an input, the media message engine 108 may enable the user 116 to password protect and/or otherwise encrypt the digital media message 114 prior to sharing. In any of the example embodiments described herein, one or more of the controls 1206 may comprise a slide bar and/or other like icon indicating whether the user 116 has privatized the digital media message 114. For example, such a control 1406 may change color, transition between a "no" indication and a "yes" indication, and/or may otherwise provide a visual indication of the privacy status/level of the digital media message 114.

The user interface 1400 may also include one or more controls 1408 configured to enable the user 116 to select one or more means of providing the digital media message 114 for sharing with a remote electronic device 118. For example, one or more such controls 1408 may enable the user 116 to select from a plurality of common social media websites and/or other portals useful in sharing the digital media message 114. In such example embodiments, the media message engine 108 may receive an input, such as a touch input, indicating of selection of the control 1408 by the user 116. In response to receiving such an input, the media message engine 108 may enable the user 116 to access an existing account on the selected social media portal. Once such an account has been accessed, the media message engine 108 may provide the digital media message 114 to the selected social media portal for sharing with remote users 120 via the selected portal.

One or more such controls 1408 may also enable the user 116 to select between email, text messaging (SMS), instant messaging, and/or other like means for sharing the digital media message 114. In such example embodiments, the media message engine 108 may receive an input, such as a touch input, indicating of selection of the control 1408 by the user 116. In response to receiving such an input, the media message engine 108 may enable the user 116 to browse, for example, an address book or other like directory stored in the memory 304 of the electronic device 104 and/or in the memory 204 of the server 102. Upon browsing such a directory, the user 116 may select one or more contacts with which the user 116 desires to share the digital media message 114, Upon selecting such contacts, the user 116 may provide the digital media message 114 to the selected users by providing an input, such as a touch input, indicative of selection of a share control 1410.

Illustrative Methods

Figure 15:
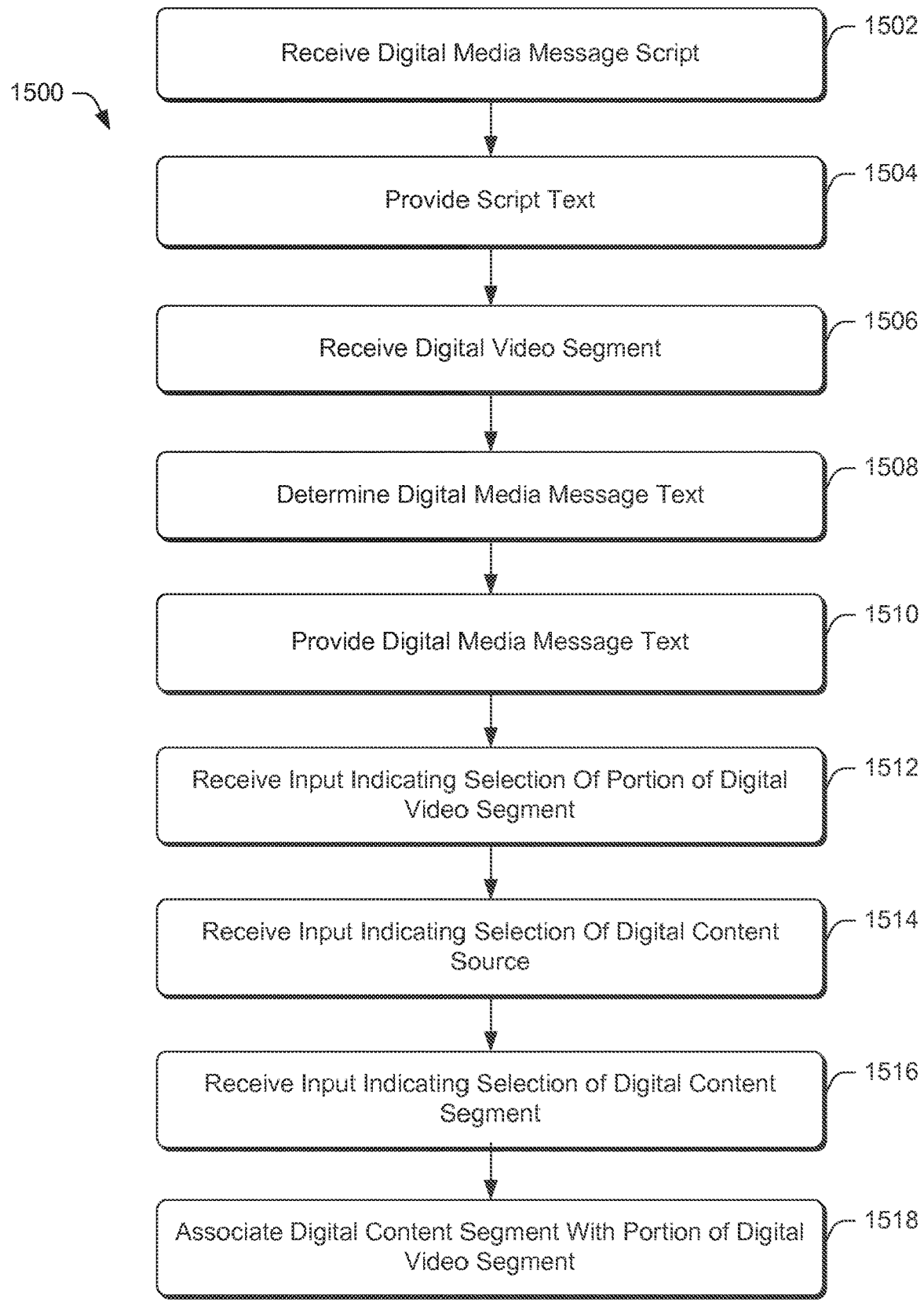
FIG. 15 is a flow diagram of an illustrative method of generating a digital media message.

FIG. 15 shows an illustrative method 1500 of generating an example digital media message 114. The example method 1500 is illustrated as a collection of steps in a logical flow diagram, which represents a sequence of operations that can be implemented in hardware, software, or a combination thereof. In the context of software, the steps represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 1500 is described with reference to the environment 100 of FIG. 1.

At block: 1502, the media message engine 108 may receive a script of a digital media message 114 being created by a user 116 of an electronic device 104. For example, the user 116 may type and/or otherwise directly enter text 406 of the script using a keyboard or other user interface devices 316 of the electronic device 104. Alternatively, the user 116 may dictate the text 406 of the script orally using, for example, a microphone and/or other user interface device 316. In examples in which the user 116 dictates the script, the electronic device 104 may receive voice and/or other audio input from the user 116 (e.g., the dictation), and the voice recognition module 314 may generate the text 406 of the script based on such input. In any of the example embodiments described herein, one or more inputs received from the user 116 at block: 1502 may be stored in the memory 304 of the electronic device 104 and/or in the memory 204 associated with the server 102.

At block 1504, the content display module 308 and/or other components of the message generation engine 108 may provide the text 406 of the script to the user 116. For example, the content display module 308 may cause various portions of the text 406 to be displayed on the display 402 of the device 104. For instance, the content display module 308 may provide a window 504 in the first portion 404 of the display 402, and various portions of the text 406 may be rendered within the window 504. In example embodiments, the text 406 may automatically scroll within the window 504 at a predetermined scroll rate. Alternatively, in further examples the message generation engine 108 may cause one or more controls to be provided via the display 402 and configured to control presentation of the text 406 within the window 504.

In some examples, the electronic device 104 may provide the text 406 of the script to the user 116 via the display 104 while capturing, recording, and/or otherwise receiving a digital video segment or other digital content segment 112. For example, at block: 1506 the message generation engine 108 may receive a digital content segment 112, such as a digital video segment. The digital video segment received at block: 1506 may comprise video of the user 116 reading the text 406 of the script, or an approximation thereof. Thus, in some examples, the content of the received digital video segment may be based on the script.

In some examples, the digital video segment or other digital content segment 112 received at block: 1506 may include a plurality of consecutive portions or other like divisions, and such portions may be indicative of desired divisions in the digital media message 114 being generated. For example, respective portions of the digital video segment received at block: 1506 may be indicative of one or more locations at which the user 116 may wish to add or insert additional digital content segments 112 into a play sequence of the digital media message 114.

In some examples, the electronic device 104 may form one or more portions of the digital video segment at block: 1506 in response to input received from the user 116. For example, the user 116 may provide a touch input or a plurality of consecutive touch inputs while the digital video segment is being recorded at block: 1506. In such examples, the message generation engine 108 may form a plurality of consecutive portions of the digital video segment in response to the plurality of consecutive touch inputs. For instance, the user 116 may provide a first touch input via the capture control 420, and the message generation engine 108 may begin recording and/or otherwise receiving the digital video segment at block: 1506 in response to the first input. The user 116 may then provide a second touch input via the capture control 420, and the message generation engine 108 may form a first portion of the digital video segment in response to the second input. For example, the first portion of the digital video segment may include audio and/or video recorded from the time the first input was received up to the time the second input was received. The plurality of consecutive portions of the digital video segment may be formed in a similar fashion in response to repeated consecutive taps, and/or other touch inputs received via the capture control 420. Additionally, the message generation engine 108 may associate metadata or other information with each of the consecutive portions formed at block: 1506, and such information may indicate, for example, start and end times of each portion, an elapsed time of each portion, a size (e.g., megabits) of each portion, a content type (e.g., audio, video, image, etc.), of each portion, a user interface device 316 used to capture each portion, a storage location of each portion in the memory 304, and/or other identifying characteristics of each respective portion. In some examples, a double tap, double touch, and/or other alternate input may stop recording at block: 1506.

At block: 1508, the message generation engine 108 may determine text 602 of the digital media message 114, and in some examples, the message generation engine 108 may determine such message text 602 corresponding to each respective portion of the digital video segment received at block: 1506. In some examples, the message generation engine 108 may determine the text 602 of the digital media message 114 by correlating, recognizing, and/or otherwise matching at least part of an audio track of the digital video segment with the text 406 of the script received at block: 1502. In such examples, the audio track may be matched with the text 602 of the script based on the elapsed time, sequence, touch inputs received via the capture control 420 at block: 1506, or other characteristics of the audio track. For example, the message generation engine 108 may match individual parts of the script text 406 with corresponding respective portions of the digital video segment at block: 1508.

Alternatively, at block: 1508 the message generation engine 108 may provide at least part of the audio track of the digital video segment as an input to the voice recognition module 314. In such examples, the voice recognition module 314 may generate the text 602 of the digital media message 114 as an output at block: 1508 based on the audio track. In particular, the voice recognition module 314 may output the message text 602 corresponding to each respective portion of the digital video segment at block: 1508. In such examples, the voice recognition module 314 and/or other components of the message generation engine 108 may separate the message text 602 into separate or otherwise distinct portions based on metadata associated with each respective separate portion of the digital video segment. Such metadata may, for example, identify and/or otherwise distinguish a first portion from a second portion, and so on.

At block: 1510 the content display module 308 may provide the digital media message text 602 via the display 402. As shown in, for example, FIG. 6 the content display module 308 may provide the text 602 corresponding to each of the plurality of consecutive portions of the digital video segment, and the text 602 corresponding to each portion may be displayed separately. For example, text 602(1) of a first portion of the plurality of consecutive portions of such a digital video segment may be displayed separate from text 602(2) of a second portion of the plurality of consecutive portions. In particular, the text 602(1) corresponding to the first portion may be displayed at a first location on the display 402 and the text 602(2) corresponding to the second portion may be displayed at a second location on the display 402 different from the first portion. In some examples, the text 602 may be displayed with lines, boxes, numbering, markings, coloring, shading, or other visual indicia separating various portions of the text 602. Providing the text 602 in this way at block: 1510 may assist the user 116 in combining a first digital content segment 112(1) (e.g., the underlying digital video segment received at block: 1506) with one or more additional digital content segments 112 (N).

For example, at block: 1512 the message generation engine 108 may receive input from the user 116 indicating selection of one or more portions of the digital video segment received at block: 1506. For example, the user 116 may select a portion of the digital video segment by providing a touch input via one or more of the controls 604. The message generation engine 108 may receive such an input via the control 604 and may, in response, cause the display 402 to provide a plurality of thumbnails 702 associated with respective digital content sources. As shown in at least FIG. 7, the message generation engine 108 may also cause the display 402 to provide text 602(4) corresponding to the selected portion of the digital video segment. Each of the thumbnails 702 may be configured to receive further input from the user 116, and the content display module 308 may cause the display 402 to provide corresponding content in response to such input.

For example, at block: 1514 and the message generation under 108 may receive an input indicating selection of one or more of the digital content sources. The user 116 may select a particular digital content source at block: 1514 by providing a touch input via one or more of the thumbnails 702. The message generation engine 108 may receive such an input via the selected thumbnail 702 and may, in response, cause the display 402 to provide a plurality of images 802 via the display 402 associated with the selected digital content source corresponding to the thumbnail 702 receiving the input. As shown in at least FIG. 8, each of the plurality of images 802 may be provided in the second portion 408 of the display 402. Further, each of the plurality of images 802 may be indicative of a respective digital content segment 112 stored in and/or otherwise associated with the digital content source corresponding to the selected thumbnail 702. Further, each of the images 802 may be indicative of a respective digital content segment 112 different from the digital video segment received at block: 1506. Such images 802 may be provided by the content display module 308 to assist the user 116 in selecting one or more digital content segments 112 for inclusion into the digital media message 114.

At block: 1516 the message generation engine 108 may receive input indicating selection of at least one digital content segment 112, and the digital content segment 112 selected at block: 1516 may be associated with a corresponding one of the plurality of images 802. For example, the user 116 may provide a touch input at a location on the display 402 in which a particular image 802 is provided. Such a touch input may indicate selection of a digital content segment 112 associated with the particular image 802. As shown in FIG. 9, in response to such input, the content display module 308 may cause the display 402 to display the image 802 associated with the selected digital content segment 112 in association with the text 602 corresponding to the portion of the digital video segment selected at block: 1512.

At block: 1518 the message generation engine 108 may combine and/or otherwise associate the digital content segment 112 selected at block: 1516 with at least a portion of the digital video segment received at block: 1506. In some examples, one or more portions of the digital video segment received at block: 1506 may include both an audio track and a video track. In such examples, at least part of one or more such tracks of the digital video segment may be supplemented, augmented, overwritten, and/or replaced by the digital content segment selected at block: 1516. For example, the message generation engine 108 may replace at least part of the video track of the underlying digital video segment with a digital image of the selected digital content segment 112 at block: 1518. As a result, the digital image of the selected digital content segment 112 may be presented simultaneously with a portion of the audio track of the digital video segment corresponding to the replaced portion of the video track. Alternatively, the message generation engine 108 may combine and/or replace at least part of the audio track of the digital video message with a selected digital audio segment 112 at block: 1518.

In some examples, adding and/or otherwise associating the selected digital content segment 112 with at least a portion of the received digital video segment at block: 1518 may include generating one or more combined message segments. In such embodiments, the selected digital content segment 112 may be merged with part of a portion of the digital video segment in order to form such a combined message segment. In such examples, the combined message segment may include, among other things, the selected digital content segment 112 (e.g., a digital image) as well as at least part of a portion of the digital video segment received at block: 1508 (e.g., the audio track from a portion of the digital video segment). In such examples, the digital image of the selected digital content segment 112 may be displayed simultaneously with audio from the portion of the digital video segment when the combined message segment is played. In particular, at block 1518 the media message engine 108 may replace, for example, video and/or images of a portion of the digital video segment with a digital image of the selected digital content segment 112.

Figure 12:
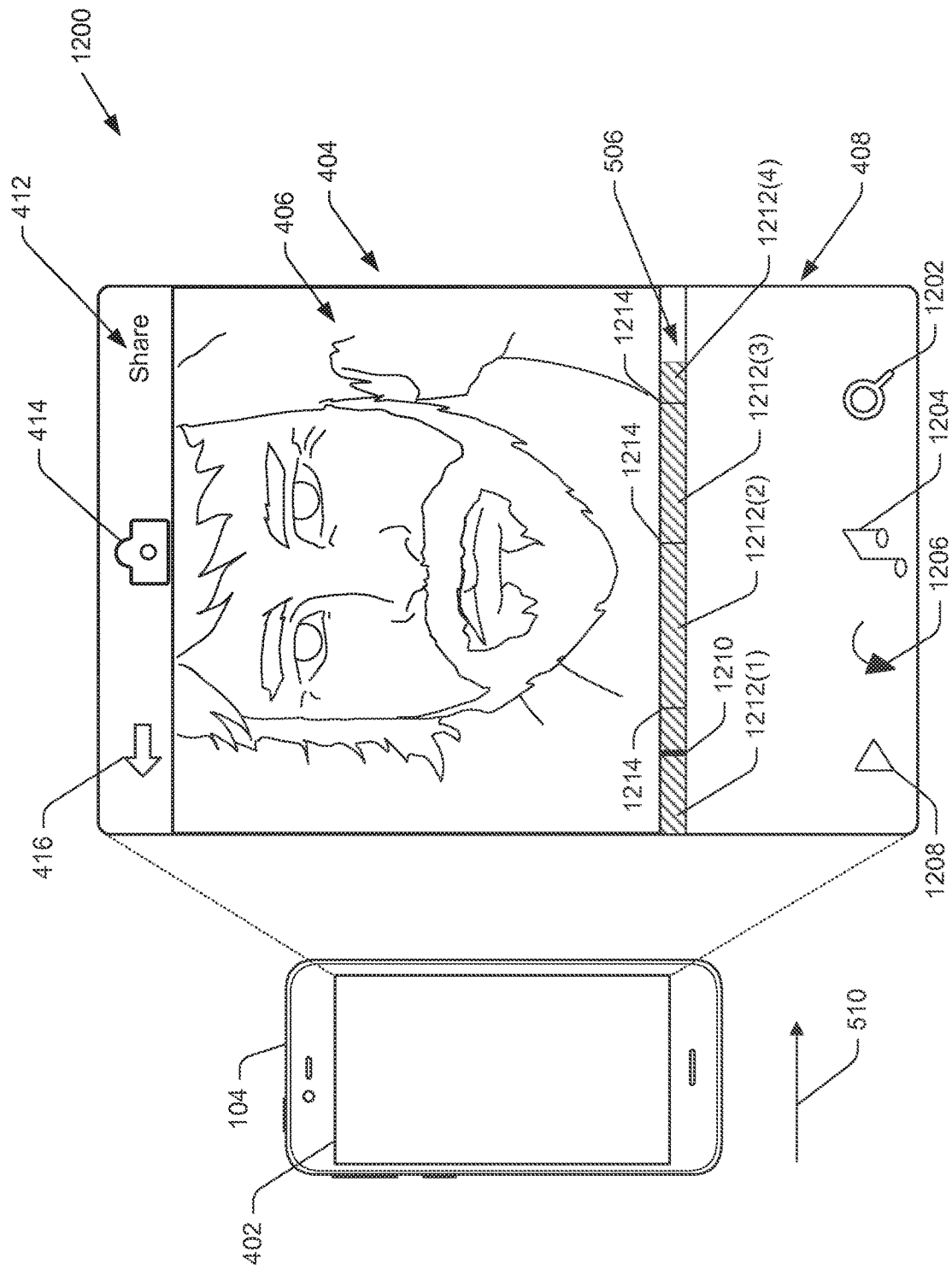
FIG. 12 shows still another illustrative user interface screen displayed on an electronic device that enables users to generate a portion of an example digital media message.

Further, at block: 1518 the message generation engine 108 may associate each portion of the digital video segment received at block: 1508, as well as the digital content segment 112 selected at block: 1516, with a play sequence of the digital media message 114. In some examples, adding and/or otherwise associating the portions of the digital video segment and one or more selected digital content segments 112 with the play sequence at block: 1518 may include adding and/or otherwise associating one or more combined message segments with the play sequence. As shown in FIG. 12, the content display module 308 may cause the display 402 to display a progress bar 506 as visual indicia of such a play sequence. Additionally, as shown in FIG. 13, the content display module 308 may cause the display 402 to display a plurality of images and/or other visual indicia 1306 of the play sequence.

In example embodiments, the processes described with respect to one or more of blocks 1510-1518 may be repeated numerous times until generation of the digital media message 114 has been completed. Additionally, the media message engine 108 may receive any number of additional inputs via, for example, the display 402. In response to such an additional input, the media message engine 108 may cause one or more additional digital content segments 112 to be inserted into the play sequence of the digital media message 114 adjacent to at least one portion of the plurality of consecutive portions of the digital video segment released at block: 1506. The insertion of such an additional digital content segment 112 is described herein with respect to at least FIGS. 10 and 11.

In response to another additional input, the media message engine 108 may direct the digital media message 114, via the electronic device 104, to a network 106 such that the digital media message 114 may be transferred over the network 106 in at least one of a text message, an email, a website, or other such portal. In this way, the digital media message 114 may be received by a remote electronic device 118, and may be consumed on the remote electronic device 118 by one or more additional users 120. In such embodiments, the digital media message 114 may include at least the combined segment described above.

In summary, example embodiments of the present disclosure provide devices and methods for generating digital media messages as a means for communication between users in remote locations. Such digital media messages include various combinations of audio, video, images, photos, and/or other digital content segments, and can be quickly and artfully created by each user with little effort. For example, the user may combine a wide variety, and a large number, of different digital content segments into a single digital media message. The methods of generating such a digital media message described herein enable the user to utilize a wide array of audio, video, and/or photo editing controls to quickly and easily modify each individual content segment, or combinations thereof. As a result, such methods provide the user with great artistic freedom in creating the digital media message. Additionally, the methods described herein may include assisting and/or guiding the user during the message generation process. For example, in some embodiments text of a desired digital media message script may be captured and provided to the user as the user records a digital video segment. The digital video segment may be used as an underlying video component of the digital media message, and the digital video segment may be of increased quality due to the script being provided to the user. As a result, such methods enable the user to generate content-rich digital media messages 114 relatively quickly, thereby facilitating the use of such digital media messages as an efficient means of communication.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
presenting, by a hardware computing device on a display screen, a graphical user interface for generating a digital media message comprising a plurality of audio segments;
presenting, by the computing device in the graphical user interface, a plurality of graphical elements each representing a respective one of the audio segments in the digital media message, the graphical elements arranged according to an order in which the corresponding audio segments will be presented when the digital media message is played, each of the plurality of graphical elements operable to select a visual content to associate with a respective one of the audio segments;
presenting, by the computing device in the graphical user interface, a plurality of text segments simultaneously, each text segment representing speech in a respective one of the audio segments in the digital media message, the text segments arranged according to an order in which the corresponding audio segments will be presented when the digital media message is played;
receiving, by the computing device, user input with respect to a first graphical element of the plurality of graphical elements presented on the graphical user interface, the user input selecting a first visual content; and
responsive to the user input with respect to the first graphical element: presenting, by the computing device, a first thumbnail image representing at least a portion of the first visual content in association with a first text segment corresponding to the first graphical element.

2. The method of claim 1, further comprising:
receiving, by the computing device, user input with respect to the plurality of text segments presented on the graphical user interface;
in response to the user input, initiating an editing operation with respect to the plurality of text segments, the editing operation including obtaining a new audio segment for the digital media message; and
presenting, by the computing device, a representation of the new audio segment in the graphical user interface.

3. The method of claim 2, wherein obtaining a new audio segment comprises:
receiving, by the computing device, user input selecting the new audio segment from storage on the computing device; and
adding the new audio segment to the digital media message.

4. The method of claim 2, wherein obtaining a new audio segment comprises:
recording, by the computing device, the new audio segment; and
adding the new audio segment to the digital media message,
wherein text corresponding to speech included in the new audio segment is associated with more than one digital video segment of the digital media message.

5. The method of claim 2, further comprising:
generating text corresponding to speech included in the new audio segment; and
generating a modified digital media message by combining the new audio segment with one or more of the plurality of audio segments.

6. The method of claim 2, further comprising:
replacing at least a portion of one of the plurality of audio segments in the digital media message with the new audio segment.

7. The method of claim 1, further comprising:
receiving, by the computing device, voice input through a microphone of the computing device; and
transcribing, by the computing device, the voice input to generate at least one of the plurality of text segments.

8. A non-transitory computer readable medium including one or more sequences of instructions that, when executed by one or more processors, cause the processors to perform operations comprising:
presenting, by a computing device, a graphical user interface for generating a digital media message comprising a plurality of audio segments;
presenting, by the computing device in the graphical user interface, a plurality of graphical elements each representing a respective one of the audio segments in the digital media message, the graphical elements arranged according to an order in which the corresponding audio segments will be presented when the digital media message is played, each of the plurality of graphical elements operable to select a visual content to associate with a respective one of the audio segments;
presenting, by the computing device in the graphical user interface, a plurality of text segments simultaneously, each text segment representing speech in a respective one of the audio segments in the digital media message, the text segments arranged according to an order in which the corresponding audio segments will be presented when the digital media message is played;
receiving, by the computing device, user input with respect to a first graphical element of the plurality of graphical elements presented on the graphical user interface, the user input selecting a first visual content; and
responsive to the user input with respect to the first graphical element: presenting, by the computing device, a first thumbnail image representing at least a portion of the first visual content in association with a first text segment corresponding to the first graphical element.

9. The non-transitory computer readable medium of claim 8, wherein the instructions cause the processors to perform operations comprising:
receiving, by the computing device, user input with respect to the plurality of text segments presented on the graphical user interface;
in response to the user input, initiating an editing operation with respect to the plurality of text segments, the editing operation including obtaining a new audio segment for the digital media message; and
presenting, by the computing device, a representation of the new audio segment in the graphical user interface.

10. The non-transitory computer readable medium of claim 9, wherein obtaining a new audio segment comprises:
receiving, by the computing device, user input selecting the new audio segment from storage on the computing device; and
adding the new audio segment to the digital media message.

11. The non-transitory computer readable medium of claim 9, wherein obtaining a new audio segment comprises:

recording, by the computing device, the new audio segment; and adding the new audio segment to the digital media message, wherein text corresponding to speech included in the new audio segment is associated with more than one digital video segment of the digital media message.

12. The non-transitory computer readable medium of claim 9, wherein the instructions cause the processors to perform operations comprising:

generating text corresponding to speech included in the new audio segment; and generating a modified digital media message by combining the new audio segment with one or more of the plurality of audio segments.

13. The non-transitory computer readable medium of claim 9, wherein the instructions cause the processors to perform operations comprising:

replacing at least a portion of one of the plurality of audio segments in the digital media message with the new audio segment.

14. The non-transitory computer readable medium of claim 8, wherein the instructions cause the processors to perform operations comprising:

receiving, by the computing device, voice input through a microphone of the computing device; and transcribing, by the computing device, the voice input to generate at least one of the plurality of text segments.

15. A system comprising:

one or more processors; and a non-transitory computer readable medium including one or more sequences of instructions that, when executed by the one or more processors, cause the processors to perform operations comprising:

presenting, by a computing device, a graphical user interface for generating a digital media message comprising a plurality of audio segments;

presenting, by the computing device in the graphical user interface, a plurality of graphical elements each representing a respective one of the audio segments in the digital media message, the graphical elements arranged according to an order in which the corresponding audio segments will be presented when the digital media message is played, each of the plurality of graphical elements operable to select a visual content to associate with a respective one of the audio segments;

presenting, by the computing device in the graphical user interface, a plurality of text segments simultaneously, each text segment representing speech in a respective one of the audio segments in the digital media message, the text segments arranged according to an order in which the corresponding audio segments will be presented when the digital media message is played;

receiving, by the computing device, user input with respect to a first graphical element of the plurality of graphical elements presented on the graphical user interface, the user input selecting a first visual content; and responsive to the user input with respect to the first graphical element: presenting, by the computing device, a first thumbnail image representing at least a portion of the first visual content in association with a first text segment corresponding to the first graphical element.

16. The system of claim 15, wherein the instructions cause the processors to perform operations comprising:

receiving, by the computing device, user input with respect to the plurality of text segments presented on the graphical user interface;

in response to the user input, initiating an editing operation with respect to the plurality of text segments, the editing operation including obtaining a new audio segment for the digital media message; and presenting, by the computing device, a representation of the new audio segment in the graphical user interface.

17. The system of claim 16, wherein obtaining a new audio segment comprises:

receiving, by the computing device, user input selecting the new audio segment from storage on the computing device; and adding the new audio segment to the digital media message.

18. The system of claim 16, wherein obtaining a new audio segment comprises:

recording, by the computing device, the new audio segment; and adding the new audio segment to the digital media message, wherein text corresponding to speech included in the new audio segment is associated with more than one digital video segment of the digital media message.

19. The system of claim 16, wherein the instructions cause the processors to perform operations comprising:

generating text corresponding to speech included in the new audio segment; and generating a modified digital media message by combining the new audio segment with one or more of the plurality of audio segments or replacing at least a portion of one of the plurality of audio segments in the digital media message with the new audio segment.

20. The system of claim 15, wherein the instructions cause the processors to perform operations comprising:

receiving, by the computing device, voice input through a microphone of the computing device; and transcribing, by the computing device, the voice input to generate at least one of the plurality of text segments.

* * * * *